United States Patent
Goto et al.

(10) Patent No.: US 10,091,153 B2
(45) Date of Patent: *Oct. 2, 2018

(54) PROCESSING MESSAGES

(71) Applicant: International Business Machines Corporation, Armonk, NY (US)

(72) Inventors: Mayumi Goto, Kanagawa (JP); Yoshio Horiuchi, Kanagawa-ken (JP); Hirotaka Matsumoto, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 167 days.

This patent is subject to a terminal disclaimer.

(21) Appl. No.: 14/701,598

(22) Filed: May 1, 2015

(65) Prior Publication Data

US 2016/0014066 A1    Jan. 14, 2016

(30) Foreign Application Priority Data

Jul. 11, 2014    (JP) .................................. 2014-143062

(51) Int. Cl.
*G06F 15/16*    (2006.01)
*H04L 12/58*    (2006.01)

(52) U.S. Cl.
CPC .............. *H04L 51/22* (2013.01); *H04L 51/16* (2013.01); *H04L 51/34* (2013.01)

(58) Field of Classification Search
CPC ....................................................... H04L 51/22

(Continued)

(56) References Cited

U.S. PATENT DOCUMENTS 7,222,156 B2 *    5/2007    Gupta ................... G06F 17/241
                                                                    709/206
7,996,025 B2 *    8/2011    Lee ........................ G06Q 10/10
                                                                    455/466

(Continued)

FOREIGN PATENT DOCUMENTS

JP          2000267976 A       9/2000
JP          2002091876 A       3/2002

(Continued)

OTHER PUBLICATIONS

Decision to Grant a Patent, Application No. 2014-143062, Translated Sep. 30, 2016, 6 pages.

(Continued)

*Primary Examiner* — Anthony Mejia
(74) *Attorney, Agent, or Firm* — Peter J. Edwards

(57) ABSTRACT

An apparatus for processing messages input from a plurality of clients. The apparatus includes an acquisition unit configured to obtain a first message input from a first client, a second message input from a second client, and a user selection input from the second client. The user selection is of a first portion of the first message and indicates that the second message is a comment on the first portion of the first message. The apparatus also includes a control unit in communication with the acquisition unit. The control unit is configured to perform a first control action in response to the acquisition unit obtaining the first message, the second message, and the user selection. The first control action results in the first message, the second message, and a first link connecting the first portion of the first message and the second message being displayed on the plurality of clients.

12 Claims, 16 Drawing Sheets

(58) Field of Classification Search
USPC .......................................................... 709/206
See application file for complete search history.

(56) References Cited

U.S. PATENT DOCUMENTS

| | | | | |
|---|---|---|---|---|
| 8,046,259 | B1* | 10/2011 | Siegel | G06Q 10/10 705/14.73 |
| 8,874,675 | B2* | 10/2014 | Chakra | G06Q 10/107 709/206 |
| 9,442,903 | B2* | 9/2016 | Katic | G06F 17/30899 |
| 2002/0059222 | A1* | 5/2002 | Sasaki | G06Q 10/10 |
| 2003/0182663 | A1* | 9/2003 | Gudorf | H04N 7/173 725/110 |
| 2004/0117444 | A1* | 6/2004 | Goodman | H04L 12/581 709/204 |
| 2005/0060375 | A1* | 3/2005 | Ernest | G06Q 10/107 709/206 |
| 2005/0102361 | A1* | 5/2005 | Winjum | G06Q 10/107 709/206 |
| 2005/0216856 | A1* | 9/2005 | Matti | G06F 17/30905 715/768 |
| 2007/0271340 | A1* | 11/2007 | Goodman | G06Q 10/107 709/206 |
| 2011/0185025 | A1* | 7/2011 | Cherukuri | H04L 12/1813 709/206 |
| 2011/0191693 | A1* | 8/2011 | Baggett | G06Q 10/107 715/752 |
| 2011/0196933 | A1* | 8/2011 | Jackson | G06Q 10/107 709/206 |
| 2012/0084367 | A1* | 4/2012 | Killoran, Jr. | G06Q 10/063112 709/206 |
| 2012/0089688 | A1* | 4/2012 | Harpur | G06Q 10/107 709/206 |
| 2013/0304830 | A1* | 11/2013 | Olsen | H04L 51/32 709/206 |
| 2014/0012927 | A1* | 1/2014 | Gertzfield | G06Q 50/01 709/206 |
| 2014/0089428 | A1* | 3/2014 | Jia | H04L 67/02 709/206 |
| 2014/0143684 | A1* | 5/2014 | Oh | H04L 51/04 715/752 |
| 2014/0164530 | A1* | 6/2014 | Stoertenbecker | H04L 51/32 709/206 |
| 2014/0204173 | A1* | 7/2014 | Eidelson | G06Q 10/107 348/14.08 |
| 2014/0280235 | A1* | 9/2014 | Lacage | G06F 17/30722 707/749 |
| 2014/0280288 | A1* | 9/2014 | Hwang | G06F 17/30637 707/766 |
| 2014/0280638 | A1* | 9/2014 | O'Dell | H04L 51/12 709/206 |
| 2015/0026266 | A1* | 1/2015 | Metcalf | H04L 51/18 709/206 |
| 2015/0032824 | A1* | 1/2015 | Kumar | H04L 51/06 709/206 |
| 2015/0220834 | A1* | 8/2015 | Banatwala | G06N 5/02 706/59 |
| 2015/0271118 | A1* | 9/2015 | Nudel | H04L 51/08 709/206 |
| 2015/0339627 | A1* | 11/2015 | Brunner | G06Q 10/10 705/345 |
| 2016/0127282 | A1* | 5/2016 | Nezarati | H04L 12/1822 715/758 |
| 2016/0179773 | A1* | 6/2016 | Shen | G06F 3/0488 715/753 |
| 2016/0182413 | A1* | 6/2016 | Shen | H04L 51/046 715/752 |

FOREIGN PATENT DOCUMENTS

| | | |
|---|---|---|
| JP | 2007534075 A | 11/2007 |
| JP | 2007328471 A | 12/2007 |
| JP | 2010152538 A | 7/2010 |
| JP | 2011140071 A | 7/2011 |
| JP | 2012253783 A | 12/2012 |
| JP | 2013168184 A | 8/2013 |
| JP | 2013178741 A | 9/2013 |

OTHER PUBLICATIONS

Goto et al., "Processing Messages", U.S. Appl. No. 15/294,917, filed Oct. 17, 2016.
IBM, List of IBM Patents or Patent Applications Treated as Related, Oct. 13, 2016, 2 pages.
Goto et al., "Apparatus and Method for Processing Messages," Japan Application No. 2014-143062, filed Jul. 11, 2014, 86 pages.
International search report dated Jun. 21, 2005, for PCT/IB2005/051277, 3 pages.

* cited by examiner

FIG. 9A

| PROPERTY NAME | VALUE |
|---|---|
| LINK | L1, L2, L4, L6 |
| TAG INFORMATION | IM1, IM2, IM3 |

FIG. 9B

| PROPERTY NAME | VALUE |
|---|---|
| LINK DESTINATION MESSAGE | M2 |
| LINK SOURCE KEYWORD | IM1 |
| TAG INFORMATION | IM1 |

FIG. 9C

| PROPERTY NAME | VALUE |
|---|---|
| LINK | L3 |
| TAG INFORMATION | IM1 |

FIG. 11

PROCESSING MESSAGES

CROSS-REFERENCE TO RELATED APPLICATION

This application is related to and claims the benefit of Japan Patent Application No. 2014-143062, filed Jul. 11, 2014, which application is incorporated by reference herein for all purposes.

BACKGROUND

The present invention relates to processing messages. In particular, the present invention relates to processing messages input from a plurality of clients.

Instant messengers have recently been used extensively as real-time communication tools.

SUMMARY

According to embodiments of the present disclosure, aspects of the disclosure may include an apparatus for processing messages input from a plurality of clients. The apparatus includes an acquisition unit. The acquisition unit is configured to obtain a first message input from a first client, a second message input from a second client, and a user selection input from the second client. The user selection is of a first portion of the first message and indicates that the second message is a comment on the first portion of the first message. The apparatus also includes a control unit in communication with the acquisition unit. The control unit is configured to perform a first control action in response to the acquisition unit obtaining the first message, the second message, and the user selection. The first control action results in the first message, the second message, and a first link connecting the first portion of the first message and the second message being displayed on the plurality of clients.

According to embodiments of the present disclosure, aspects of the disclosure may also include a method for processing messages input from a plurality of clients. As part of the method, a first message input from a first client, a second message input from a second client, and a user selection input from the second client are obtained. The user selection is of a first portion of the first message and indicates that the second message is a comment on the first portion of the first message. A first control action is performed in response to the first message, the second message, and the user selection having been obtained. The first control action results in the first message, the second message, and a first link connecting the first portion of the first message and the second message being displayed on the plurality of clients.

According to embodiments of the present disclosure, aspects of the disclosure may also include a non-transitory computer readable medium. The computer readable medium embodies a computer program for causing a computer to perform a method for processing messages input from a plurality of clients. As part of the method, a first message input from a first client, a second message input from a second client, and a user selection input from the second client are obtained. The user selection is of a first portion of the first message and indicates that the second message is a comment on the first portion of the first message. A first control action is performed in response to the first message, the second message, and the user selection having been obtained. The first control action results in the first message, the second message, and a first link connecting the first portion of the first message and the second message being displayed on the plurality of clients.

The above summary is not intended to limit the present disclosure.

BRIEF DESCRIPTION OF THE DRAWINGS

FIGS. 9A, 9B, and 9C are diagrams showing examples of message properties and link properties stored in a message-information storage section, in accordance with some embodiments of the present invention.

FIG. 11 is a diagram illustrating a first example suggest function, in accordance with some embodiments of the present invention.

DETAILED DESCRIPTION

Figure 1:
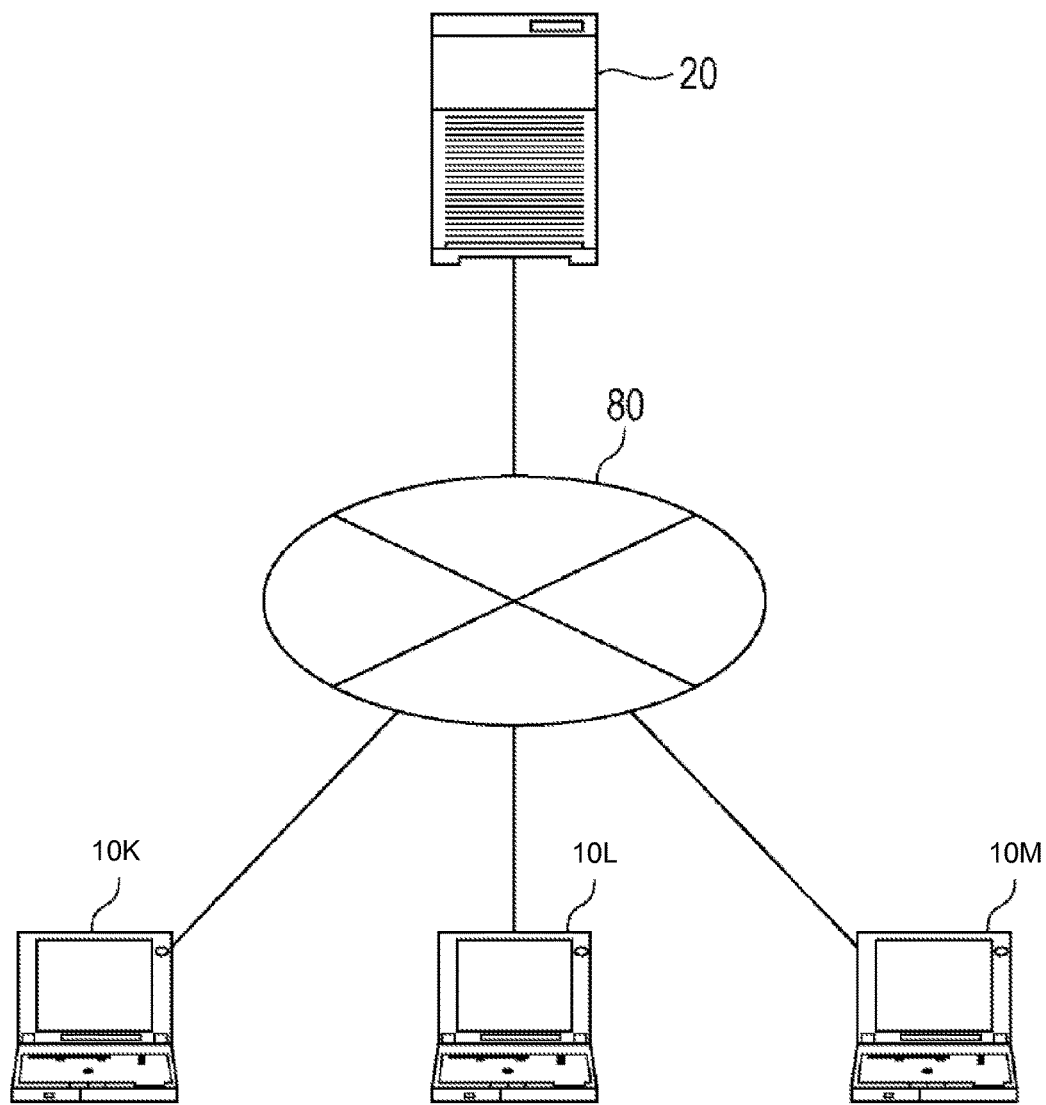
FIG. 1 is a diagram showing an example of the overall configuration of a computer system, in accordance with some embodiments of the present invention.

Some embodiments of the present invention will be described in detail herein with reference to the attached drawings.

Connection or context of messages in instant messaging is sometimes difficult to understand. For example, it is sometimes difficult to know whose and what message one message is a reply to. It is also sometimes difficult to know whether one message is a reply to the whole of another message or part of another message. Another cause of the difficulty in understanding the context of messages is that though a user can see a message when the user replies to the message, the message becomes invisible when the user scrolls through the screen of an instant messenger.

Thus, in order to make it easy to understand the context of messages, assigning remarks made on a network to threads may be performed. In some situations, a display may be used in which a thread (group of remarks) consisting of remarks of member users may be created on the basis of a thread creating instruction from the user and member users' instructions. Other users in the thread may be notified about the information, so that the thread information is shared in the network. Instead of designating users, remarks to be included in the thread may be designated. Further, in some situations, a chat controller may provide information exchange in the form of a plurality chat lines among a plurality of chat clients registered with a chat room, and a thread management controller may determine one or more relationships among the chat lines and specifies one or more threads corresponding to the relationships, and may assign each of the chat lines to one of the threads.

Assigning remarks made on a network to threads may not clearly show to what message another message is input as a comment. Some embodiments of the present invention may allow for a clear showing of to which message another message is input as a comment, thereby making it easy to understand the context of messages.

Some embodiments may include an apparatus for processing messages input from a plurality of clients, which apparatus may include an acquisition unit configured to obtain a first message input from a first client and a second message input from a second client as a comment on at least part of the first message. Also included, may be a control unit configured to perform such control that the first message, the second message, and a link connecting the at least part of the first message and the second message are displayed.

In some embodiments, the acquisition unit may obtain a message input as a comment on one part of the first message as the second message and may further obtain a third message input as a comment on another part of the first message. When an operation of selecting either the one part of the first message or the second message is performed, the control unit may perform such control that the first message and the second message are displayed and the third message is not displayed. The acquisition unit may further obtain a fourth message input as a comment on the whole of the first message. When an operation of selecting either the one part of the first message or the second message is performed, the control unit may perform such control that the fourth message is further displayed.

In some embodiments, the acquisition unit may obtain a message input as a comment on one part of the first message as the second message and may further obtain a third message input as a comment on another part of the first message and a fourth message input as a comment on the whole of the first message. When an operation of selecting any of the first message, the second message, and the third message is performed, the control unit may perform such control that the fourth message is displayed.

In some embodiments, the apparatus may further include a notification unit configured, when one part of the first message is selected and a comment on another part of the first message has already been input, to notify the another part. The acquisition unit may obtain a message input as a comment on the one part and the another part of the first message as the second message.

In some embodiments, when an operation of moving one end of the link from at least part of the first message to at least part of a fifth message is performed, the control unit may perform such control that a link connecting at least part of the fifth message and the second message is displayed.

In some embodiments, when an operation of moving one end of the link from the second message to a sixth message is performed, the control unit may perform such control that a link connecting at least part of the first message and the sixth message is displayed.

Furthermore, in some embodiments, the acquisition unit may obtain a seventh message input irrespective of the first message and the second message. The control unit may perform such control that the seventh message is displayed, and that when an operation of associating one message of the first message and the second message with the seventh message is performed, a link connecting the one message and the seventh message is further displayed.

Some embodiments may include an apparatus for processing messages input from a plurality of clients, which apparatus may include an acquisition unit configured to obtain a first message input from a first client, a second message input from a second client as a comment on one part of the first message, and a third message input from a third client as a comment on another part of the first message. The apparatus may also include a generating unit configured to generate link information indicating that the one part of the first message and the second message are linked and that the another part of the first message and the third message are linked. The apparatus may further include a control unit configured to perform such control that the first message, the second message, and the third message are displayed, and when an operation of selecting either the one part of the first message or the second message is performed, the third message whose linkage with the another part of the first message is indicated by the link information is not displayed.

Some embodiments may include a method for processing messages input from a plurality of clients, which method may include the steps of obtaining a first message input from a first client; displaying the first message; obtaining a second message input from a second client as a comment on at least part of the first message; displaying the second message; and displaying a link connecting the at least part of the first message and the second message.

Some embodiments may include a program, which program may cause a computer to function as an apparatus for processing messages input from a plurality of clients. The program may cause the computer to function as an acquisition unit configured to obtain a first message input from a first client and a second message input from a second client as a comment on at least part of the first message. The may further cause the computer to function as a control unit configured to perform such control that the first message, the second message, and a link connecting the at least part of the first message and the second message are displayed.

According to some embodiments, the context of messages can easily be understood by clearly showing on what message another message is input as a comment.

FIG. 1 is a diagram showing an example of the overall configuration of a computer system, in accordance with some embodiments of the present invention. As shown in the diagram, this computer system is configured such that clients 10K, 10L, 10L and an instant messaging server (hereinafter referred to as "IM server") 20 are connected through a network 80. Although FIG. 1 shows the clients 10K to 10M, they may be referred to herein as clients 10. Although FIG. 1 shows only three clients 10, four or more clients 10 may be provided.

The clients 10 may be computers for use in communications among users using an instant messenger. Specifically, each client 10 may display a message input by one user and may transmit the message to the other clients 10 via the IM server 20. The client 10 may receive a message that is input by another user to another client 10 via the IM server 20 and may display it. Examples of the clients 10 include a desktop personal computer (PC), a notebook PC, a tablet PC, a wearable computer, a personal digital assistant (PDA), a smartphone, and a portable phone.

The IM server 20 is may be a computer causing the instant messenger, which is a communication tool among clients 10, to run. Specifically, the IM server 20 may manage the clients 10 that join instant messaging, and when receiving a message from one client 10, may transmit the message to all the other joining clients 10. The IM server 20 may store the message as data. The data may hereinafter be referred to as "message data". An example of the IM server 20 is a PC.

The network 80, which may be the Internet, is a communication means for use in telecommunications between the clients 10 and the IM server 20.

Figure 2:
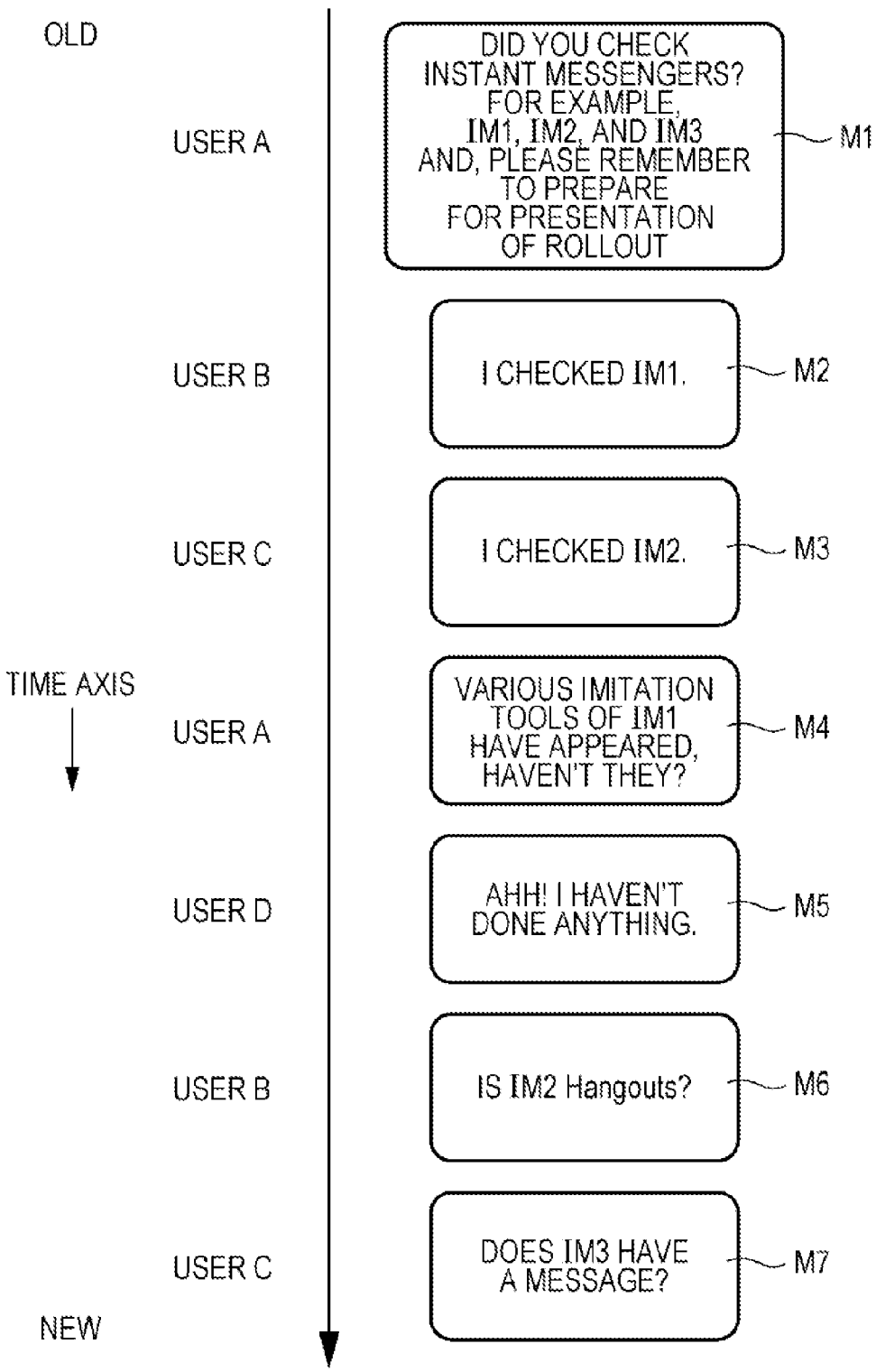
FIG. 2 is a diagram showing an example of a display using general instant messaging, in accordance with some embodiments of the present invention.

FIG. 2 is a diagram showing an example of a display in the client 10 in a computer system with such a configuration using general instant messaging, in accordance with some embodiments of the present invention. This display shows that a user A first inputs a message M1, then a user B inputs a message M2, a user C inputs a message M3, and the user A again inputs a message M4. Thereafter, a user D inputs a message M5, the user B inputs a message M6, and the user C inputs a message M7.

However, in this display, the messages are displayed in order of input. Accordingly, it may be difficult to know which message links to which other message, that is, which message is a reply to which other message. It may also be difficult to know to which part of another message one message replies.

For example, the display example in FIG. 2 has the following context: the message M1 includes keywords "IM1", "IM2", and "IM3" indicating three instant messengers. Among them, for "IM1", the user B returns the message M2, and the user A returns the message M4 in response to that; for "IM2", the user C returns the message M3, and the user B returns the message M6 in response to that; and for "IM3", the user C returns the message M7. On the other hand, the user D returns the message M5 to the whole of the message M1. However, such context may not be obtainable from the displayed information.

Thus, some embodiments are configured to designate a target of a reply and to link the reply message to the target.

Figure 3:
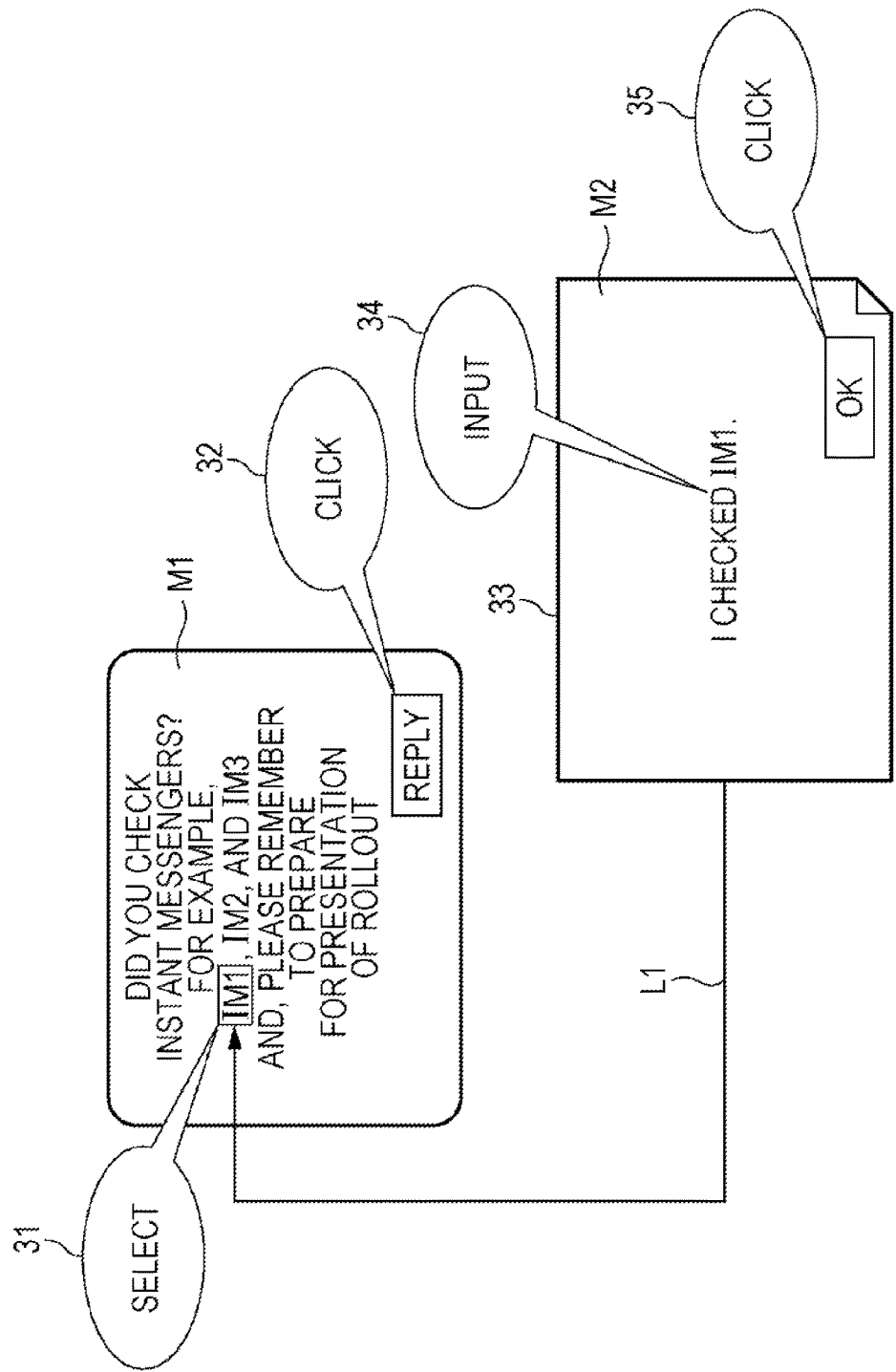
FIG. 3 is a diagram showing an example of an operation of designating a target of a reply and inputting a message directed thereto, in accordance with some embodiments of the present invention.

FIG. 3 is a diagram showing an example of an operation of designating a target of a reply and inputting a message directed thereto, in accordance with some embodiments of the present invention. This diagram shows an extracted scene in which the user B inputs the message M2 in response to the message M1 in FIG. 2.

First, the user B selects the keyword "IM1" in the message M1, as shown by a balloon 31. Subsequently, the user B clicks on a reply button, as shown by a balloon 32. Then, a reply window 33 for inputting a reply message is displayed, and the user B inputs the message M2 in the reply window 33, as shown by a balloon 34. Thereafter, when the user B clicks on an OK button, as shown by a balloon 35, the return of the message M2 to the message M1 is completed. Thus, the message M2 is associated with the keyword "IM1" in the message M1, and a link L1 indicating the association is displayed. Such association is achieved by, for example, adding a tag "IM1" to the message M1, the message M2, and the link L1, as described herein.

Another example in which some message is input in response to a previous message is an expression of agreement with the previous message, in addition to a reply. These responses can be generalized to "comments", but the depicted embodiment is described using a reply as an example.

Figure 4:
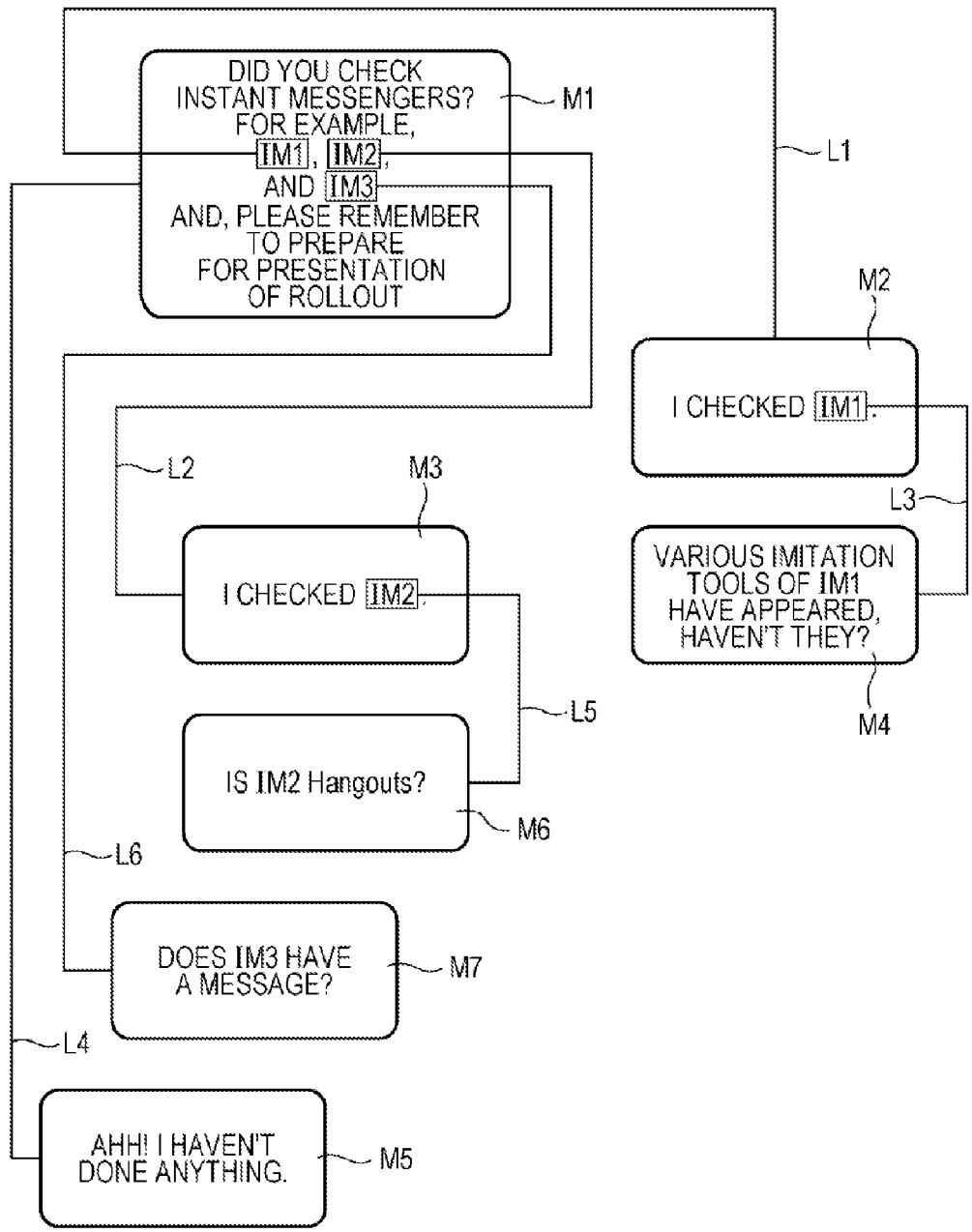
FIG. 4 is a diagram showing a display example in which each user performs the operation of designating a target of the reply and inputting a message directed thereto, in accordance with some embodiments of the present invention.

FIG. 4 is a diagram showing a display example in which the operation shown in FIG. 3 is performed when the users return the messages shown in FIG. 2, in accordance with some embodiments of the present invention. Such a display may be a goal of some embodiments in which keywords designated as the targets of replies and all messages linked to the keywords are displayed. Specifically, since all of the messages M2 to M7 are linked to the keywords in the message M1 or the entire message M1, all of the messages M1 to M7 may be displayed. Furthermore, since the keywords in the message M1 or the whole of the message M1 and the messages M2 to M7 have the associations described in FIG. 2, links L1 to L6 indicating such associations are also displayed. A reply to the whole of a message may be regarded as a reply to all keywords designated as the targets of the reply in the message. Here, the message M1 is used as an example of a first message, the message M3 is used an example of a second message that is input as a comment to at least part of the first message, and the link L2 is used as an example of a link that links at least part of the first message and the second message.

In some embodiments, a thread, which is a collection of messages related to the same subject, may be created by following the linked messages. This is achieved by, for example, following a tag added to related messages and a link there between.

Figure 5:
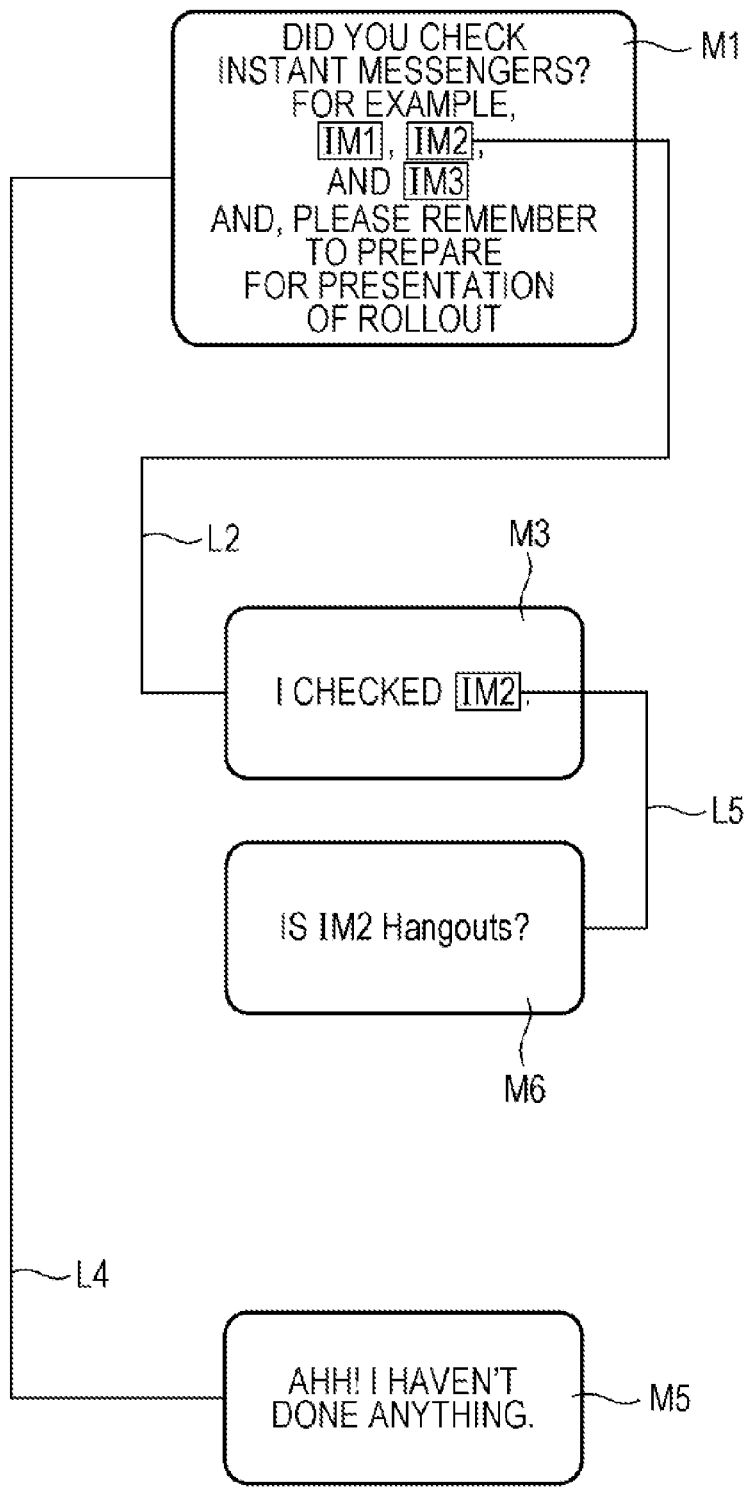
FIG. 5 is a diagram showing an example of a thread-by-thread display, in accordance with some embodiments of the present invention.

FIG. 5 is a diagram showing an example of a thread-by-thread display, in accordance with some embodiments of the present invention. This shows a display generated when the user selects the message M6 in the display shown in FIG. 4. Such display may be achieved by following the keyword linked from the message M6. Also, when the message M3 or the keyword "IM2" in the messages M1 and M3 are selected, the same display may be presented. On the other hand, for example, the message M2 may not be displayed because it does not appear in a path through which the user reaches the message M1 by following the links. Here, the message M2 is used as an example of a third message that is not displayed when an operation of selecting either part of the first message or the second message is performed. There is also a message, like the message M5, which is not linked to the keyword linked from the message M6 but is linked to the whole of the message including the keyword. In some embodiments, such a message may be displayed in the same thread. Here, the message M5 is used as an example of a fourth message that is input as a comment on the whole of the first message and is displayed when an operation of selecting either part of the first message or the second message is performed.

Figure 6:
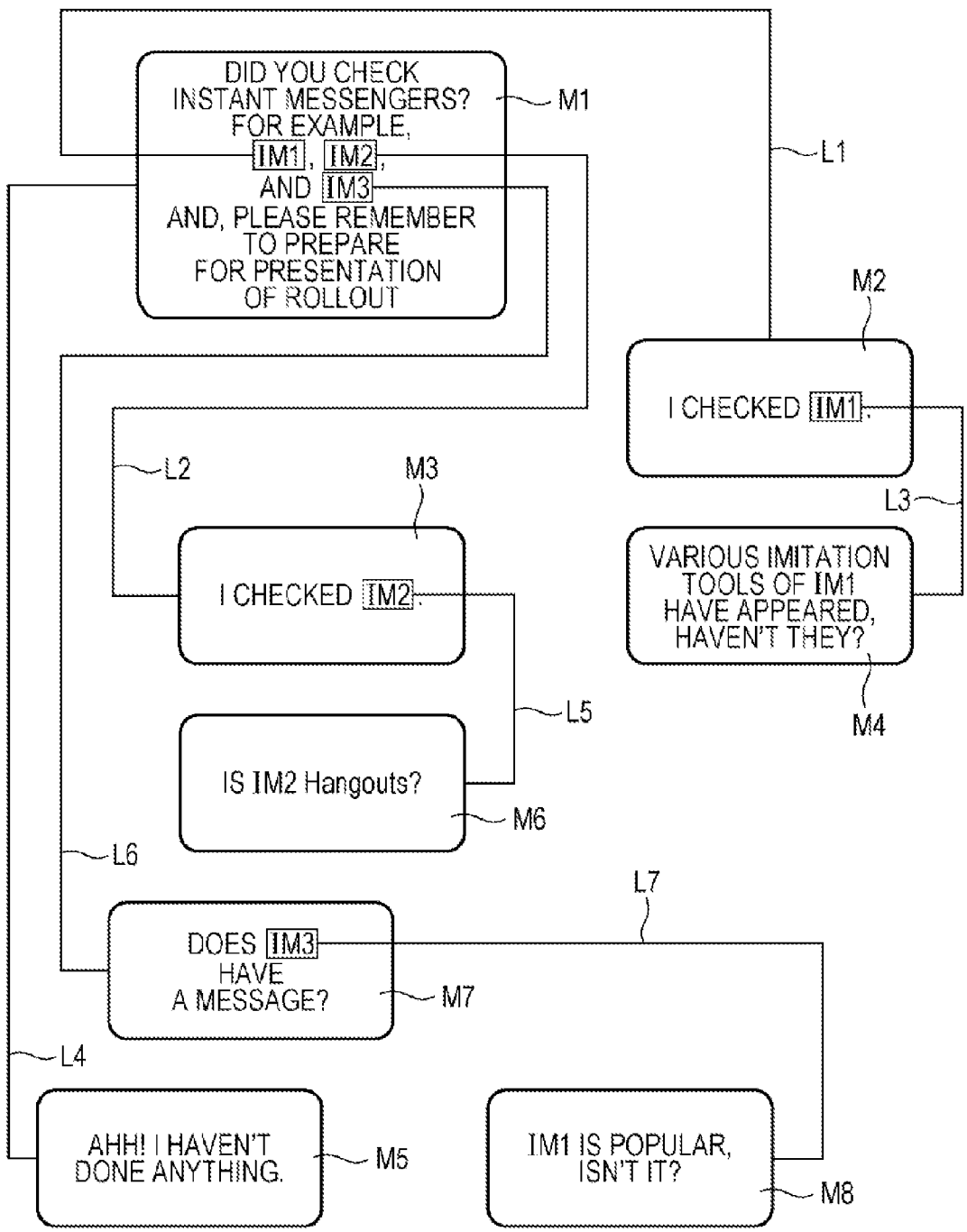
FIG. 6 is a diagram showing a display example before a link is replaced, in accordance with some embodiments of the present invention.
Figure 7:
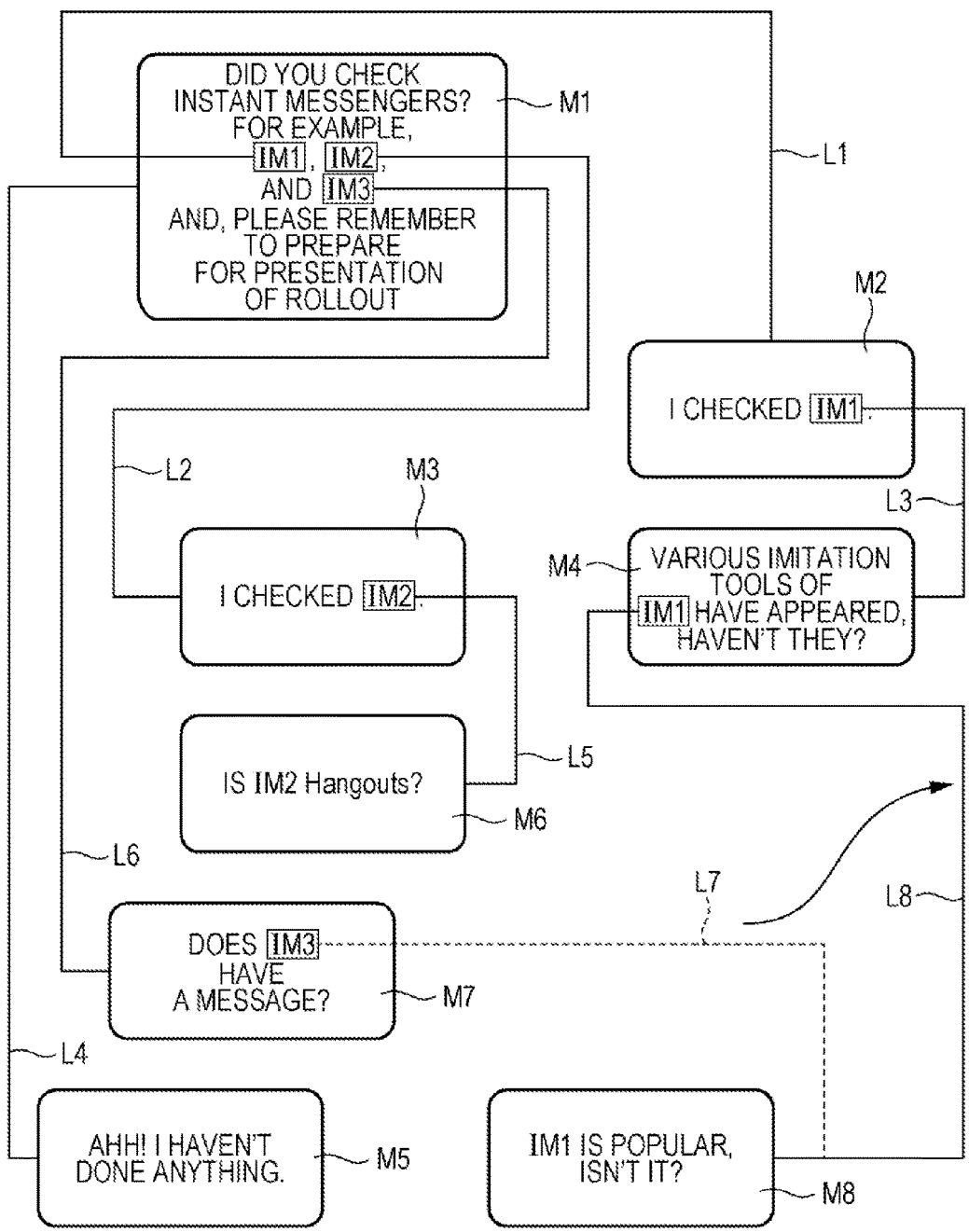
FIG. 7 is a diagram showing a second display example after a link is replaced in the display example of FIG. 6, in accordance with some embodiments of the present invention.

In some embodiments replacement of a link from one message to another message may also be allowed. FIGS. 6 and 7 are diagrams showing a display example of the replacement of a link, in accordance with some embodiments of the present invention.

First, as shown in FIG. 6, assume that a user inputs a message M8, with the keyword "IM3" in the message M7 as the target of the reply. Then, a link L7 indicating a link between "IM3" in the message M7 and the message M8 is displayed.

However, assume that after such a display is presented, the user realizes that "IM3" in the message M7 being set as the target of the reply was a mistake because the message M8 is a message about "IM1". In this case, the user can perform an operation of replacing the link to the keyword "IM3" in message 7 with a link to the keyword "IM1" in the message M4, which is a correct target, as shown in FIG. 7. This operation allows the link L7 to be hidden as indicated by the broken line and a link L8 to be displayed. Here, the message M7 is used as an example of a first message, which is a source message at one end of a link; the message M8 is used as an example of a second message at which a link connecting to at least part of a fifth message is displayed when an operation of moving one end of the link from at least part of the first message to at least part of the fifth message is performed; and the message M4 is used as an example of the fifth message at which the link connecting to the second message is displayed when the end of the link is moved.

In FIGS. 6 and 7, the one end of the link connected to the message is fixed, and the other end of the link connected to the keyword is connected to a different keyword; however, some embodiments of present invention are not limited thereto. Alternatively, in some embodiments, the end of the link connected to the keyword may be fixed, and the end of the link connected to the message may be connected to a different message. In this case, for example, the latter end of the link L7 is connected to a message other than the message M8. Here, the message, as a substitute of the message M8, is used as an example of a sixth message at which a link connecting to at least part of a first message is displayed when one end of the link has moved thereto.

Figure 8:
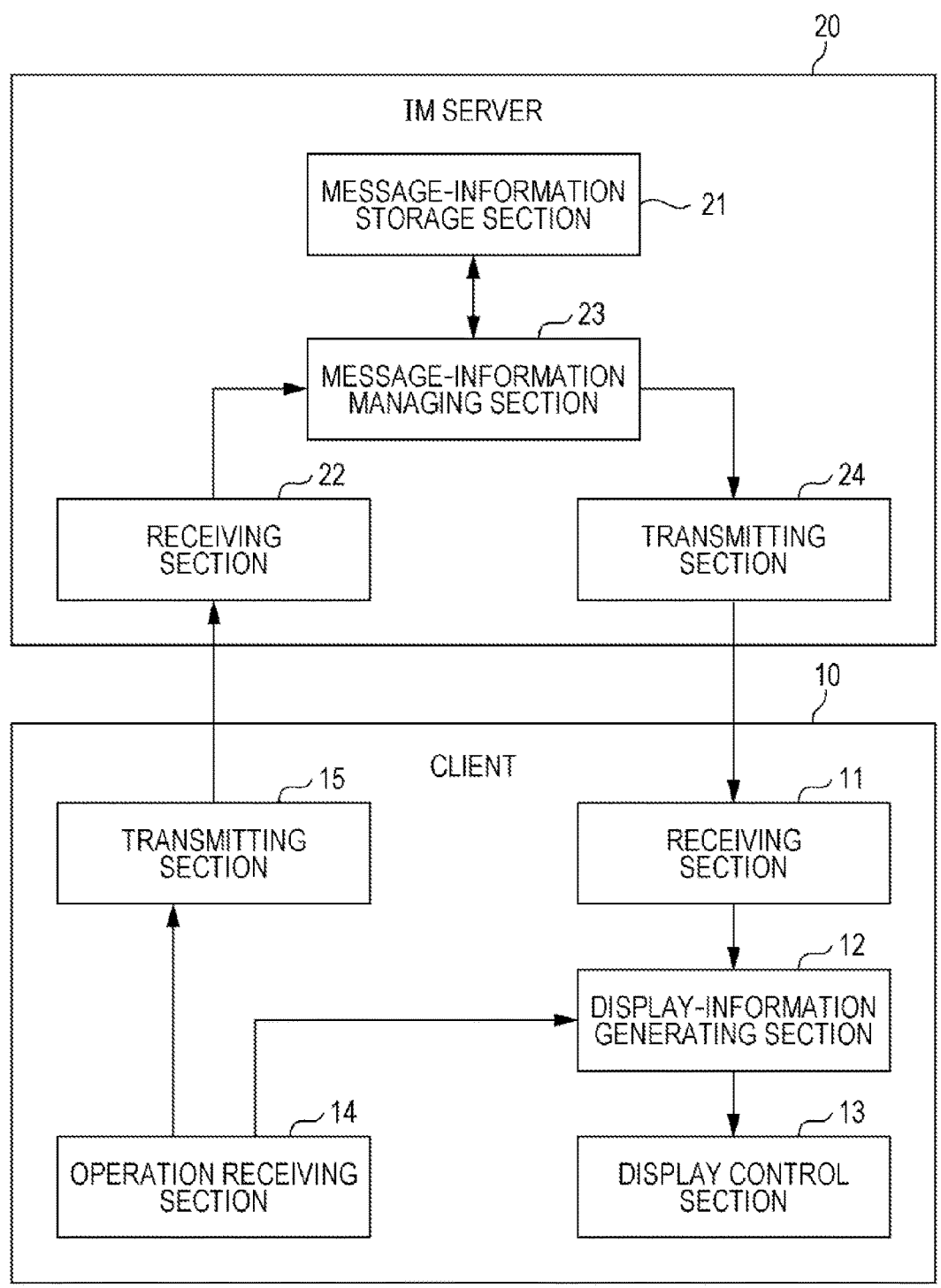
FIG. 8 is a diagram illustrating an example of the functional configuration of a client and an instant messenger server (IM server), in accordance with some embodiments of the present invention.

FIG. 8 is a diagram illustrating an example of the functional configuration of the client 10 and the IM server 20 for implementing the above outline, in accordance with some embodiments of the present invention. As shown in FIG. 8, the client 10 may include a receiving section 11, a display-information generating section 12, a display control section 13, an operation receiving section 14, and a transmitting section 15. The IM server 20 includes a message-information storage section 21, a receiving section 22, a message-information managing section 23, and a transmitting section 24.

Some embodiments of the processing sections constituting the client 10 are described herein.

The receiving section 11 mat receive a message information set from the IM server 20. The message information may include message data and the properties of the message data. The receiving section 11 may receive information, from the IM server 20, indicating that a message related to another message, which has already been displayed, is stored in the IM server 20 (the former message is hereinafter referred to as "related message", and the latter message is hereinafter referred to as "displayed message").

The display-information generating section 12 may generate display information for displaying a GUI on the basis of the message information set that the receiving section 11 receives. When the receiving section 11 receives information indicating that a related message is stored in the IM server 20, the display-information generating section 12 may generate display information for displaying an icon representing the related message. Furthermore, when the operation receiving section 14 receives a user operation, the display-information generating section 12 may generate display information for displaying a GUI corresponding to the user operation. For example, if the user operation is for selecting a keyword in a message, the display-information generating section 12 may generate display information for displaying a reply window for inputting a message about the keyword. For another example, if the user operation is for selecting a message, the display-information generating section 12 may generate display information for displaying only a series of messages connected to the message. For yet another example, if the user operation is for selecting a link between messages, the display-information generating section 12 may generate display information for displaying an icon that can be dragged to the starting end and the terminal end of the messages. For yet another example, if the user operation is for dragging and dropping the icon, the display-information generating section 12 may generate display information for displaying a dialog box for querying whether to move the link or add a link.

The display control section 13 may control a display system 10d (see, e.g., FIG. 16) so as to present a display based on display information generated by the display-information generating section 12.

The operation receiving section 14 may receive a user operation on the GUI displayed under the control of the display control section 13.

When the operation receiving section 14 receives a user operation, the transmitting section 15 may transmit information about the user operation to the IM server 20. For example, if the user operation is for inputting a message in a reply window, the transmitting section 15 may transmit the message to the IM server 20. For another example, if the user operation is for selecting an icon representing a related message, the transmitting section 15 may transmit information specifying the related message to the IM server 20. For yet another example, if the user operation is for associating a displayed message with a related message, the transmitting section 15 may transmit information indicating that the messages are to be associated to the IM server 20. Furthermore, if the user operation is for designating whether to move the link or add a link, the transmitting section 15 may transmit information indicating the starting end and the terminal end of an existing link (hereinafter referred to as "existing-starting-end-and-terminal-end information"), information indicating the starting end and the terminal end of a new link (hereinafter referred to as "new-starting-end-and-terminal-end information"), and classification on whether to move the link or add a link (hereinafter referred to as, "movement/addition classification") to the IM server 20.

Some embodiments of the processing sections and the storage section that constitute the IM server 20 are described herein.

The message-information storage section 21 may store message information. The message information may include message data and the properties of the message data, as described herein. The properties of the message data may include message properties and link properties. The message properties may include a plurality of items of metadata, such as tag information. The link properties may express the context of messages and may also include a plurality of items of metadata, such as tag information. The tag information may be the URLs of tags stored in the IM server 20.

The receiving section 22 may receive information on user operations from the client 10. For example, if the user operation is for inputting a message in a reply window, the receiving section 22 may receive the message from the client 10. For another example, if the user operation is for selecting an icon that represents a related message, the receiving section 22 may receive information specifying the related message from the client 10, and if the user operation is for associating a displayed message with the related message, the receiving section 22 may receive information indicating that the messages are to be associated from the client 10. Furthermore, if the user operation is for designating whether to move the link or add a link, the receiving section 22 may receive the existing-starting-end-and-terminal-end information, the new-starting-end-and-terminal-end information, and the movement/addition classification from the client 10. In some embodiments, the receiving section 22 may be an example of an acquisition unit for obtaining messages.

The message-information managing section 23 may update message information stored in the message-information storage section 21 on the basis of information on a user operation that the receiving section 22 receives. For example, if information on the user operation is a message input to a reply window, the message-information managing section 23 may add message data on the message and may set a link between a keyword that is the target of the reply of the message and the added message data. For another example, if information on the user operation is information indicating that a displayed message and a related message are to be associated with each other, the message-information managing section 23 may set a link between the message data on the messages. For another example, if information on the user operation is the existing-starting-end-and-terminal-end information, the new-starting-end-and-terminal-end information, and the movement/addition classification, the message-information managing section 23 may move the target link or may add a link. Furthermore, the message-information managing section 23 may read message information stored in the message-information storage section 21. Furthermore, the message-information managing section 23 may determine whether a related message is stored in the message-information storage section 21. In some embodiments, the message-information managing section 23 may be an example of a generating unit for generating link information.

The transmitting section 24 may transmit a message information set that the message-information managing section 23 read to the client 10. For example, if the message-information managing section 23 determines that a related message is stored in the message-information storage section 21, the transmitting section 24 may transmit information, to the client 10, indicating that the related message is stored in the IM server 20. In some embodiments, the transmitting section 24 may be an example of a control unit for performing control so that a message or the like is displayed or hidden.

Some details of message properties and link properties that may be stored in some embodiments of a message-information storage section 21 are described herein. FIGS. 9A to 9C are diagrams illustrating examples of message properties and link properties, in accordance with some embodiments of the present invention. The diagrams show the properties for the message M1 and the message M2 in FIG. 4.

FIG. 9A shows part of the message properties of the message M1, which relates to links. As shown in FIG. 9A, the message properties have, as link values, links L1, L2, L4, and L6 connecting to the message M1, and have keywords "IM1", "IM2", and "IM3" as tag information.

FIG. 9B is part of the link properties of the link L1 connecting to the message M1. As shown in FIG. 9B, the link properties have, as a link destination message value, the message M2, which is the destination of the link L1, and have, as link source keyword and tag information values, the keyword "IM1" designated as the target of a reply to the message M2. In some embodiments, the link properties are examples of link information.

FIG. 9C shows part of the message properties of the message M2, which relates to links. As shown in FIG. 9C, the message properties have, as a link value, the link L3 connecting to the message M2, and have, as a tag information value, the keyword "IM1" designated as the target of a reply to the message M2.

Figure 10:
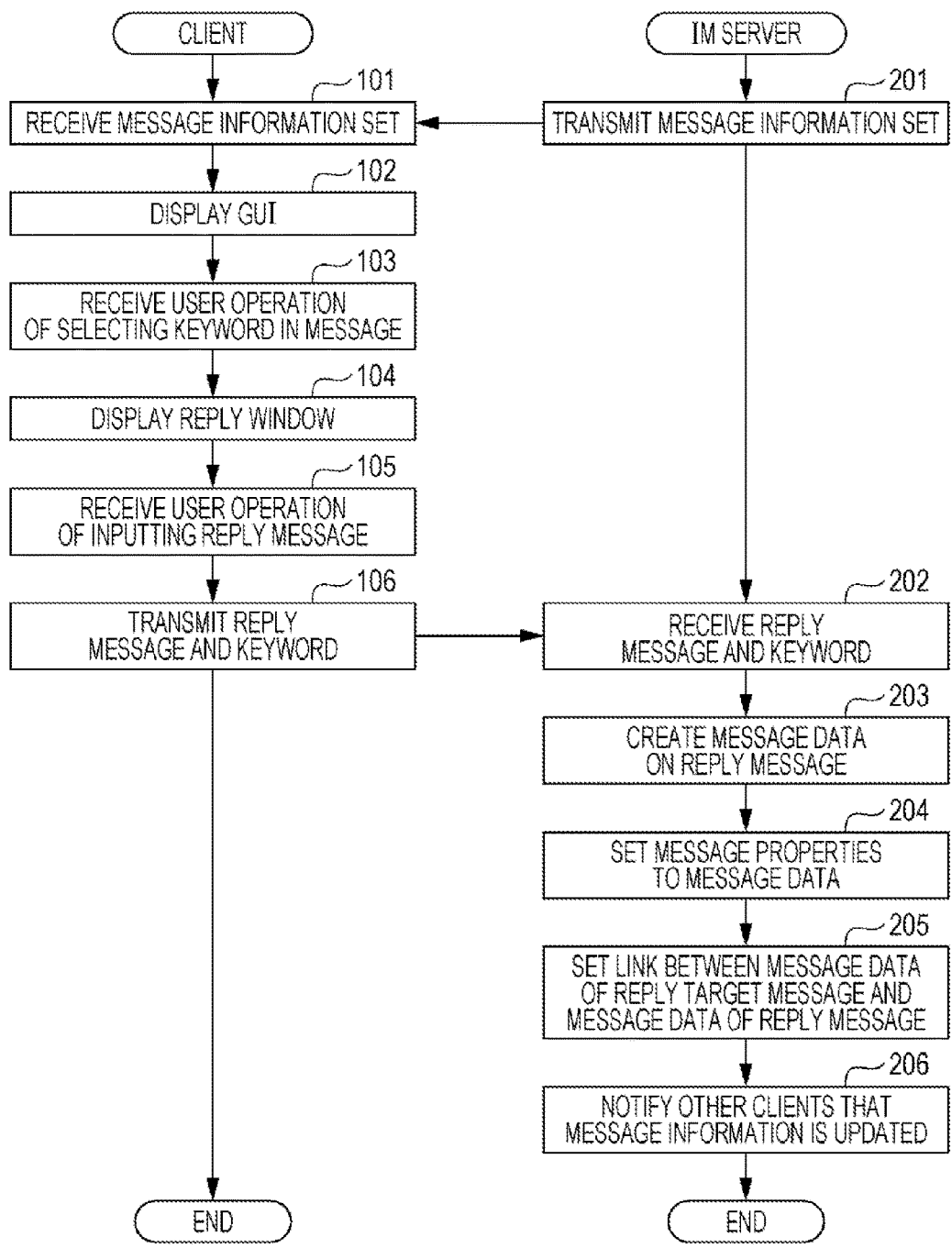
FIG. 10 is a sequence diagram showing an operation example of the client and the IM server in the operation of designating a target of the reply and inputting a message directed thereto, in accordance with some embodiments of the present invention.

FIG. 10 is a sequence diagram showing an operation example of the client 10 and the IM server 20 in implementing the outline shown in FIGS. 3 and 4, in accordance with some embodiments of the present invention. This operation is started, for example, when the user sends a request to start instant messaging from the client 10 to the IM server 20.

As shown in FIG. 10, at the IM server 20, first, the message-information managing section 23 may read a message information set from the message-information storage section 21, and the transmitting section 24 may transmit the message information set to the client 10 (step 201). Here, the message-information managing section 23 may read a message information set related to a session explicitly designated by the user from the message-information storage section 21. Alternatively, the message-information managing section 23 may decide a session related to the user, such as a session to which the user is invited, a session to which the user applies for joining, or a session including a hot tag, and read a message information set related to the decided session.

Thus, at the client 10, the receiving section 11 may receive the message information set from the IM server 20 (step 101). The display-information generating section 12 may generate display information for displaying a GUI based on the message information set, and the display control section 13 may controls the display system 10D (see, e.g., FIG. 16) so that a display based on the display information is presented (step 102). Specifically, the display-information generating section 12 may generate a message portion in the GUI on the basis of message data included in the message information. Furthermore, the display-information generating section 12 may generate a link portion in the GUI on the basis of message properties and link properties included in the message information. The display control section 13 may control the display system 10D so that a GUI including a message set and a link between the messages is displayed.

When the user performs an operation of selecting a keyword in a reply target message, the operation receiving section 14 may receive the operation (step 103). The user may select a plurality of reply target keywords. Alternatively, a keyword suggested using a reply suggest function may be selected. An example of the reply suggest function is a function of displaying a keyword corresponding to existing tag information as a candidate for selection.

Figure 11:
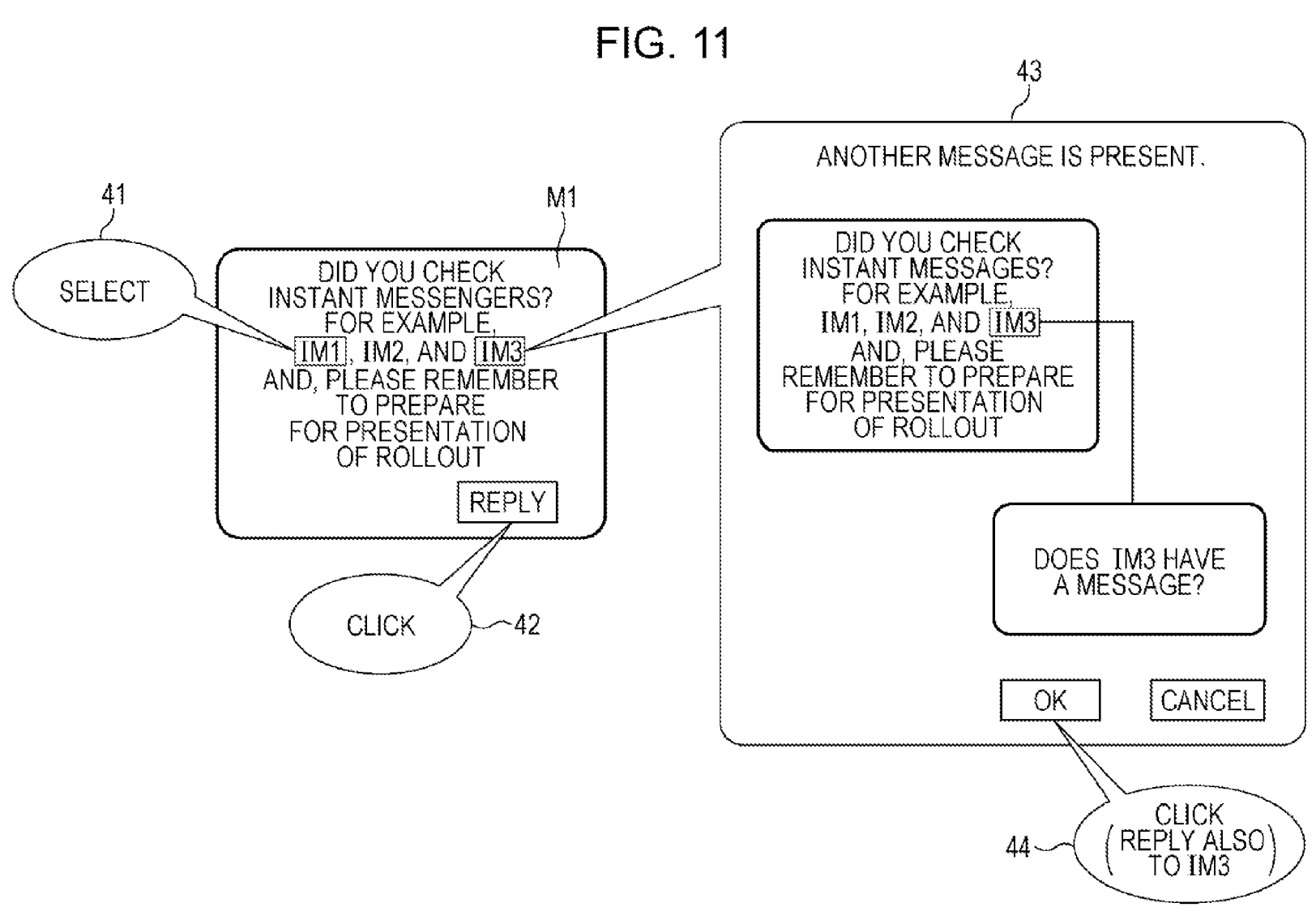

Specifically, as shown in FIG. 11, assume that the user selects the keyword "IM1" in the message M1 as indicated by a balloon 41, with the message M1 displayed, and clicks on a reply button as indicated by a balloon 42. Then, a notification window 43 for notifying that a message input as a reply to the keyword "IM3" is present is displayed. Although, in this example, the notification window 43 is a balloon-shaped window originating from the keyword "IM3", any GUI may be used, such as a rectangular window linked to the keyword "IM3". Furthermore, a thread of the existing message may be displayed in the notification window 43. In this state, the user may notify the system that he intends to reply to the existing reply target at the same time by clicking on an OK button, as indicated by a balloon 44. Alternatively, the user may notify the system of that he intends to reply to a plurality of existing reply targets at the same time by taking the same action on the plurality of existing reply targets.

Figure 12:
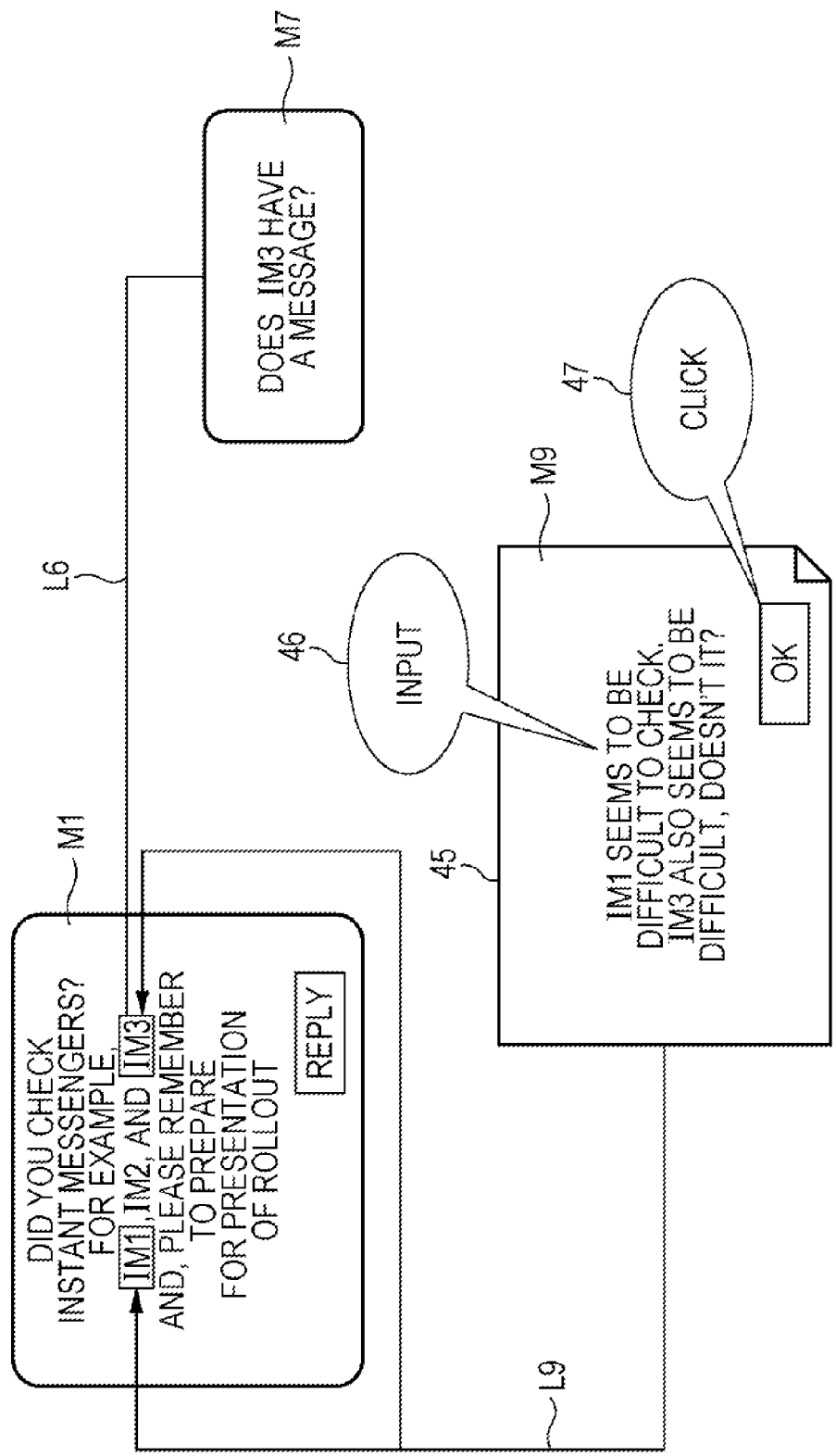
FIG. 12 is a diagram illustrating a second example suggest function, in accordance with some embodiments of the present invention.

Then, as shown in FIG. 12, the selected existing message M7 and the link L6 connecting thereto may be displayed. At that time, a thread of the message M7 may be displayed. Furthermore, since a reply window 45 for inputting a reply message is displayed, the user may input a message M9 for the keywords "IM1" and "IM3" in the reply window 45, as indicated by a balloon 46. Thereafter, when the user clicks on an OK button, as indicated by a balloon 47, the reply to the message M1 by the message M9 is completed. Thus, the keywords "IM1" and "IM3" in the message M1 may be associated with the message M9, and the link L9 indicating the association may be displayed. Such association is achieved by, for example, adding a tag "IM1" to the message M1 and adding tags "IM1", "IM3" to the message M9 and the link L9. The link L9 may include not only a link to a location selected first but also a location selected using the suggest function. All related reply messages may be finally displayed.

Referring again to FIG. 10, the description of the operation example of the client 10 and the IM server 20 will be continued. Upon receiving an operation of selecting a keyword in a message at step 103, the operation receiving section 14 may hold the selected keyword. Thereafter, the display-information generating section 12 may generate display information for displaying a reply window, and the display control section 13 may control the display system 10D (see, e.g., FIG. 16) so that a display based on the display information is presented (step 104).

When the user performs an operation of inputting a reply message in response to that presentation, the operation receiving section 14 may receive the operation (step 105). Then, the transmitting section 15 may transmit the message that the operation receiving section 14 received and the keyword held by the operation receiving section 14 to the IM server 20 (step 106).

Thus, at the IM server 20, the receiving section 22 may receive the message and the keyword from the client 10 (step 202). The message-information managing section 23 may create message data about the received message and may store the message data in the message-information storage section 21 (step 203). The message-information managing section 23 may set message properties to the message data created at step 203 and may store the message properties in the message-information storage section 21 (step 204). Specifically, the message-information managing section 23 may create message properties of the message data created at step 203, may set the keyword selected at step 103 as tag information, and may store the tag information in the message-information storage section 21. Furthermore, the message-information managing section 23 may set a link between the message data on the reply target message set at step 103 and the message data created at step 203 and may store information on the link in the message-information storage section 21 (step 205). Specifically, the message-information managing section 23 may set the link between the two messages to the message properties of the reply target message selected at step 103 and may set the keyword selected at step 103 as tag information. Furthermore, the message-information managing section 23 may create link properties of the set link, may set information specifying the message data created at step 203 as link destination message, may set the keyword selected at step 103 as a link source keyword and tag information, and may store the link source keyword and tag information in the message-information storage section 21.

Thereafter, the transmitting section 24 may notify all other clients 10 related to this session that the message information is updated (step 206).

This operation ends, for example, when the user sends a request to terminate the instant messaging from the client 10 to the IM server 20.

In this operation example, in some embodiments, there are at least two conceivable methods for reflecting, to a GUI displayed in the client 10, the reply message input at step 105 and a link between the reply target message and the reply message.

A first method may include receiving updated message information from the IM server 20 after step 206, and reflecting the reply message and the link to the GUI displayed on the client 10 on the basis of the updated message information.

A second method may include updating the message information received and held at step 101 with the display-information generating section 12 in parallel with updating the message information with the IM server 20, and reflecting the reply message and the link to the GUI displayed in the client 10 on the basis of the message information updated by the display-information generating section 12.

Figure 13:
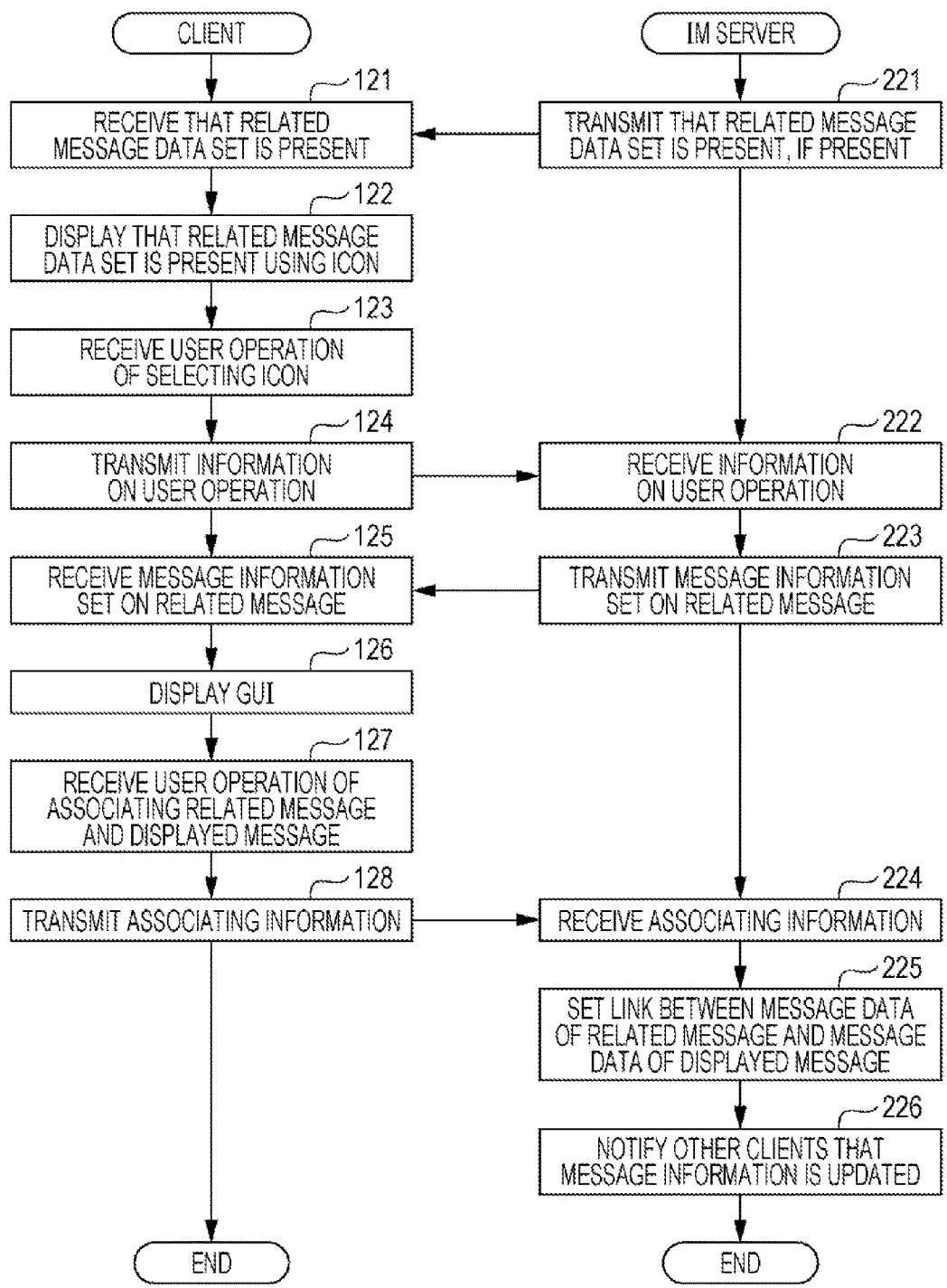
FIG. 13 is a sequence diagram showing an operation example in which the operation of the client and the IM server for designating a target of the reply and inputting a message directed thereto is expanded, in accordance with some embodiments of the present invention.

FIG. 13 is a sequence diagram showing an operation example in which the operation of the client 10 and the IM server 20, shown in FIG. 10, is expanded, in accordance with some embodiments of the present invention. After the message information is updated at steps 203 to 205 in FIG. 10, the following operation may be performed.

Specifically, as shown in FIG. 13, at the IM server 20, the message-information managing section 23 may determine whether a message data set related to the message data on the reply message, which is displayed on the client 10 as a result of the operation in FIG. 10, is stored in the message-information storage section 21, and if it is determined that the related message data set is present, the transmitting section 24 may return the determination to the client 10 (step 221). For example, if the character string of the tag information included in the message properties of the message data stored at step 204 matches the character string of tag information included in the message properties of message data that other users exchange, these message data may be regarded as related message data.

Thus, at the client 10, the receiving section 11 may receive information indicating that a related message data set is present from the IM server 20 (step 121). The display-information generating section 12 may generate display information for displaying a GUI indicating the information, such as an icon, and the display control section 13 may control the display system 10D (see, e.g., FIG. 16) so that a display based on the display information may be presented (step 122). The icon or the like may be displayed by user, area, time, and so on. Although the icons or the like is taken as an example, any other display objects that are visual signs represented by icons or the like may be displayed.

When the user performs an operation of selecting an icon in response to that display, the operation receiving section 14 may receive the operation (step 123). Then, the transmitting section 15 may transmit information indicating that the operation of selecting an icon has been performed to the IM server 20 (step 124).

Thus, at the IM server 20, the receiving section 22 may receive the information indicating that the operation of selecting an icon has been performed (step 222). Then, the message-information managing section 23 may read a message information set related to the related message indicated by the icon selected at step 123 from the message-information storage section 21, and the transmitting section 24 may transmit the message information set to the client 10 (step 223).

Thus, at the client 10, the receiving section 11 may receive the message information set related to the related message from the IM server 20 (step 125). Then, the display-information generating section 12 may generate display information for displaying a GUI on the basis of the message information set related to the related message, and the display control section 13 may control the display system 10D (see, e.g., FIG. 16) so that a display based on the display information may be presented (step 126). Specifically, the display-information generating section 12 may generate a message portion of the GUI on the basis of message data included in the message information. The display-information generating section 12 further may generate a link portion of the GUI on the basis of message properties and link properties included in the message information. The display control section 13 may control the display system 10D so that a GUI including the message set and a link between the messages is displayed. The related message may be an example of a seventh message input irrespective of the first message and the second message.

When the user performs an operation of associating the related message displayed at step 126 and a reply message that has already been displayed (displayed message) in response to that display, the operation receiving section 14 may receive the operation (step 127). Then, the transmitting section 15 may transmit information indicating that the operation of associating the messages has been performed to the IM server 20 (step 128).

Thus, at the IM server 20, the receiving section 22 may receive the information indicating that the operation of associating the messages has been performed (step 224). Then, the message-information managing section 23 may set a link between message data of the related message and message data of the displayed message (step 225). Specifically, the message-information managing section 23 may set to the message properties of the displayed message a link between the two messages and the tag information set to the message properties of the related message. Furthermore, the message-information managing section 23 may sets to the message properties of the related message a link between the two messages and the tag information set to the message properties of the displayed message. Furthermore, the message-information managing section 23 may create the link properties of the set link, may set the related message as a link destination message, may set the tag information of the displayed message, which is also the tag information of the related message, as a link source keyword and tag information, and may store them in the message-information storage section 21.

Thereafter, the transmitting section 24 may notify all the other clients 10 related to this session and all clients 10 exchanging related messages that the message information has been updated (step 226). Thus, the message set may be displayed also on the clients 10 exchanging the related messages. The message set may be represented, for example, by an icon or the like in an abbreviated form, or may be displayed in detail according to an instruction of the user to explicitly display it.

In this operation example, in some embodiments, there may be at least two methods for reflecting the link between the related message and the displayed message to a GUI displayed on the client 10.

A first method may include receiving updated message information from the IM server 20 after step 226, and reflecting the reply message and the link to the GUI displayed on the client 10 on the basis of the updated message information.

A second method may include updating the message information received and held at step 125 with the display-information generating section 12 in parallel with updating the message information with the IM server 20, and reflecting the reply message and the link to the GUI displayed in the client 10 on the basis of the message information updated by the display-information generating section 12.

Figure 14:
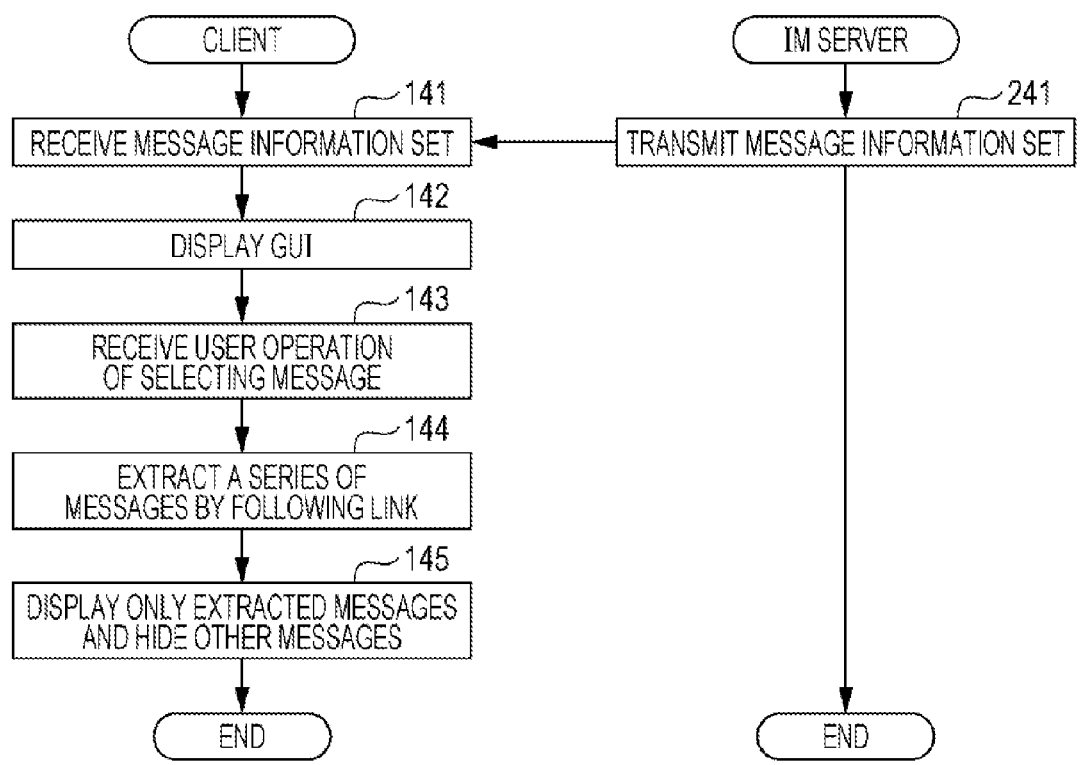
FIG. 14 is a sequence diagram showing an operation example of the client and the IM server for presenting a thread-by-thread display, in accordance with some embodiments of the present invention.

FIG. 14 is a sequence diagram showing an operation example of the client 10 and the IM server 20 when implementing the outline shown in FIG. 5, in accordance with some embodiments of the present invention. This operation is started, for example, when the user sends a request to start instant messaging from the client 10 to the IM server 20.

As shown in FIG. 14, at the IM server 20, the message-information managing section 23 may read a message information set from the message-information storage section 21, and the transmitting section 24 may transmit the message information set to the client 10 (step 241).

Thus, at the client 10, the receiving section 11 may receive the message information set from the IM server 20 (step 141). The display-information generating section 12 may generate display information for displaying a GUI based on the message information set, and the display control section 13 may control the display system 10D (see, e.g., FIG. 16) so that a display based on the display information is presented (step 142). Specifically, the display-information generating section 12 may generate a message portion in the GUI on the basis of message data included in the message information. Furthermore, the display-information generating section 12 may generate a link portion in the GUI on the basis of message properties and link properties included in the message information. The display control section 13 may control the display system 10D so that a GUI including a message set and a link between the messages is displayed.

When the user performs an operation of selecting a message, the operation receiving section 14 may receive the operation (step 143). Then, the display-information generating section 12 may extract a series of messages from the message information received at step 141 by following a link (step 144). Specifically, the display-information generating section 12 may extract messages and a link that have message properties and link properties, respectively, that have the same tag information as the message properties of the message selected at step 143. Then, the display-information generating section 12 may generate display information for displaying only the series of extracted messages and hiding the other messages, and the display control section 13 may control the display system 10D (see, e.g., FIG. 16) so that a display based on the display information is presented (step 145).

Although, in this operation example, the process of extracting a series of messages by following a link is performed at the client 10, the process may be performed, in some embodiments, at the IM server 20. For example, in some embodiments, the client 10 and the IM server 20 may perform the following operation. At the client 10, the operation receiving section 14 may receive the user operation of selecting a message, and the transmitting section 15 may transmit information to the IM server 20 indicating that the operation of selecting a message has been performed. Thus, at the IM server 20, the receiving section 22 may receive the information indicating that the operation of selecting a message has been performed from the client 10, and the message-information managing section 23 may extract a series of messages from the message information stored in the message-information storage section 21 by following a link, and the transmitting section 24 may transmit the series of extracted messages to the client 10. Thus, at the client 10, the receiving section 11 may receive the series of extracted messages from the IM server 20, the display-information generating section 12 may generate display information for displaying the series of extracted messages and hiding the other messages, and the display control section 13 may controls the display system 10D (see, e.g., FIG. 16) so that a display based on the display information is presented.

Figure 15:
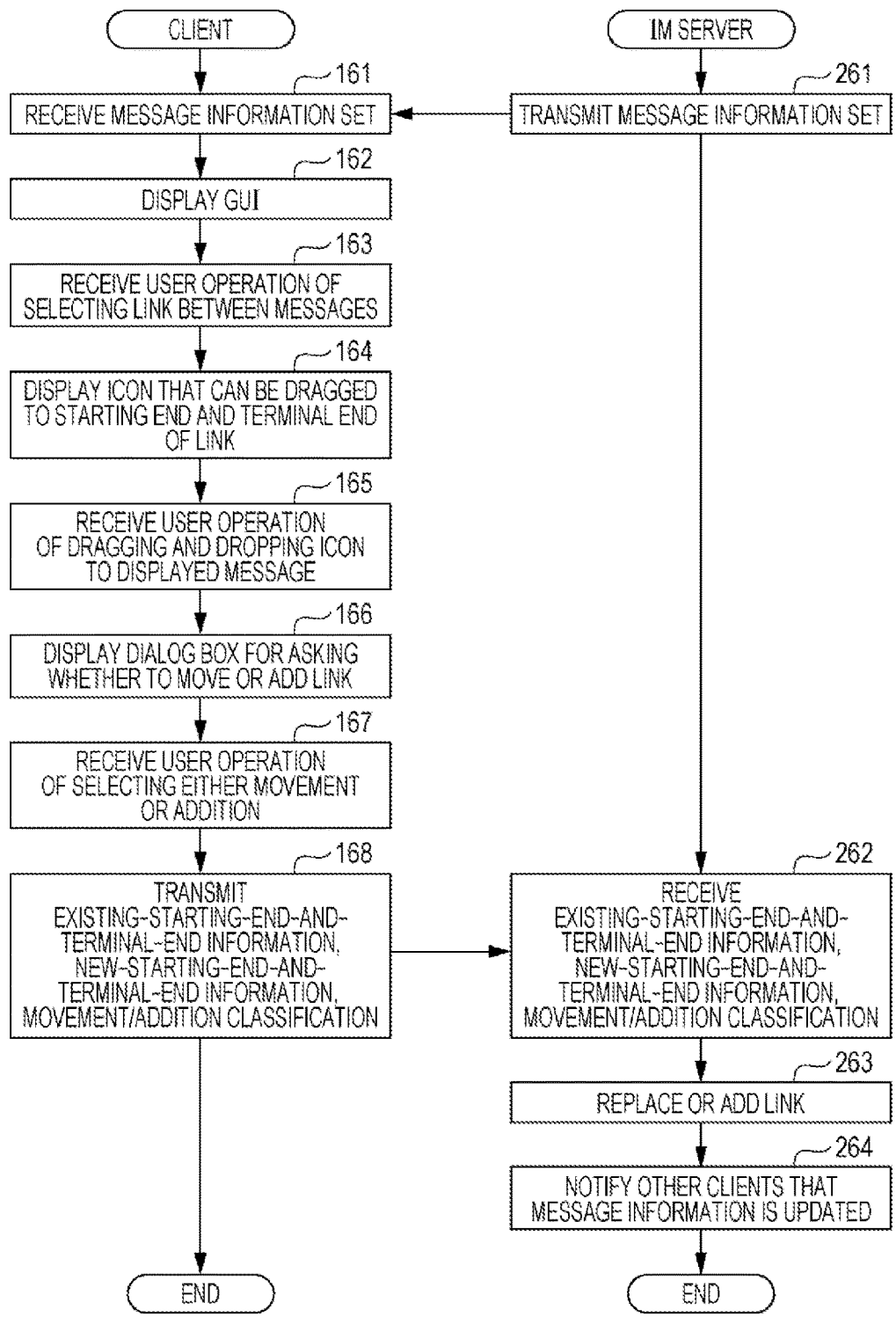
FIG. 15 is a sequence diagram showing an operation example of the client and the IM server when in replacing a link, in accordance with some embodiments of the present invention.

FIG. 15 is a sequence diagram showing an operation example of the client 10 and the IM server 20 when implementing the outline shown in FIGS. 6 and 7, in accordance with some embodiments of the present invention. This operation is started, for example, when the user sends a request to start instant messaging from the client 10 to the IM server 20. Here, an end of a link connecting to a keyword may be referred to as a "starting end", and an end of the link connecting to a message may be referred to as a "terminal end".

As shown in FIG. 15, at the IM server 20, the message-information managing section 23 may read a message information set from the message-information storage section 21, and the transmitting section 24 may transmit the message information set to the client 10 (step 261).

Thus, at the client 10, the receiving section 11 may receive the message information set from the IM server 20 (step 161). The display-information generating section 12 may generate display information for displaying a GUI based on the message information set, and the display control section 13 may control the display system 10*d* (see, e.g., FIG. 16) so that a display based on the display information is presented (step 162). Specifically, the display-information generating section 12 may generate a message portion in the GUI on the basis of message data included in the message information. Furthermore, the display-information generating section 12 may generate a link portion in the GUI on the basis of message properties and link properties included in the message information. The display control section 13 may control the display system 10D so that a GUI including a message set and a link between the messages is displayed.

When the user performs an operation of selecting a link between messages, the operation receiving section 14 may receive the operation (step 163). At that time, the operation receiving section 14 may hold existing-starting-end-and-terminal-end information including a keyword at the starting end of the selected link and a message at the terminal end. Thereafter, the display-information generating section 12 may generate display information for displaying an icon that can be dragged to the starting end and the terminal end of the link, and the display control section 13 may control the display system 10D (see, e.g., FIG. 16) so that a display based on the display information is presented (step 164).

When the user performs an operation of dragging and dropping the icon to a displayed message in response to that presentation, the operation receiving section 14 may receive the operation (step 165). When an icon at the starting end of the link is dragged and dropped, the operation receiving section 14 may hold new-starting-end-and-terminal-end information including a keyword at the dragged and dropped portion as a keyword at the starting end of the link, and the same message as that before the drag & drop as a message at the terminal end of the link. When an icon at the terminal end of the link is dragged and dropped, the operation receiving section 14 may hold new-starting-end-and-terminal-end information including the same message as that before the drag & drop as a message at the starting end of the link, and a keyword at the dragged and dropped portion as a keyword at the terminal end of the link. Thereafter, the display-information generating section 12 may generate display information for displaying a dialog box for asking whether to move the link or add a link, and the display control section 13 may control the display system 10D (see, e.g., FIG. 16) so that a display based on the display information is presented (step 166).

When the user performs an operation of selecting whether to move the link or add a link in response to that presentation, the operation receiving section 14 may receive the operation (step 167). Then, the transmitting section 15 may transmit the existing-starting-end-and-terminal-end information and the new-starting-end-and-terminal-end information that the operation receiving section 14 held before and the movement/addition classification for distinguishing whether to move the link or add a link that the operation receiving section 14 received to the IM server 20 (step 168).

Thus, at the IM server 20, the receiving section 22 may receive the existing-starting-end-and-terminal-end information, the new-starting-end-and-terminal-end information, and the movement/addition classification (step 262). Then, the message-information managing section 23 may replace the link between target messages or adds a new link there between (step 263). Specifically, the message-information managing section 23 may create link properties of the link indicated by the new-starting-end-and-terminal-end information, may set a message at the terminal end included in the new-starting-end-and-terminal-end information to the link properties as a link destination message, and may set a keyword at the starting end included in the new-starting-end-and-terminal-end information as a link source keyword and as tag information, and may store them in the message-information storage section 21. Furthermore, the message-information managing section 23 may set the set link to the message properties of the message at the starting end. Furthermore, the message-information managing section 23 may set tag information set to the message properties of the message at the starting end to the message properties of the message at the terminal end. If the movement/addition classification indicates addition, the process may be terminated, but if the movement/addition classification indicates movement, the existing link may be deleted. In other words, the message-information managing section 23 may delete the link properties of the link indicated by the existing-starting-end-and-terminal-end information. The message-information managing section 23 may delete the deleted link from the message properties of the message at the starting end. Furthermore, the message-information managing section 23 may delete tag information set to the message properties of the message at the starting end from the message properties of the message at the terminal end.

Thereafter, the transmitting section 24 may notify all the other clients 10 related to this session that the message information has been updated (step 264).

In this operation example, in some embodiments, there may be at least two methods for reflecting replacement or addition of a link to a GUI displayed on the client 10.

A first method may involve receiving updated message information from the IM server 20 after step 264, and reflecting the replacement or addition of a link to the GUI displayed on the client 10 on the basis of the updated message information.

A second method may involve reflecting the replacement or addition of a link to a GUI displayed on the client 10 on the basis of the existing-starting-end-and-terminal-end information, the new-starting-end-and-terminal-end information, and the movement/addition classification transmitted at step 168 in parallel with updating message information at the IM server 20.

In other words, some embodiments are configured on the assumption that the IM server 20 manages message information collectively and updates them; however, the present invention is not limited thereto. For example, in some embodiments, the client 10 may receive message information from the IM server 20, and the client 10 may update it, as shown as variations of the individual operation examples. In such embodiments, the receiving section 11 may function as an example of an acquisition unit that obtains a message; the display-information generating section 12 may function as an example of a generating unit that generates link information, and the display control section 13 may function as an example of a control unit that performs control so that a message or the like is displayed or hidden.

Some embodiments are configured to link a reply target keyword and a reply message and display them graphically, as described above. This may allow the context of messages in instant messaging to be clearly shown.

Furthermore, some embodiments may have the function of displaying or hiding messages thread by thread. This may allow only a thread that the user is interested in to be displayed.

Furthermore, some embodiments may have the function of changing the destination of a link between messages. This may allow a thread of messages to be created afterwards to show the context of a series of messages.

Figure 16:
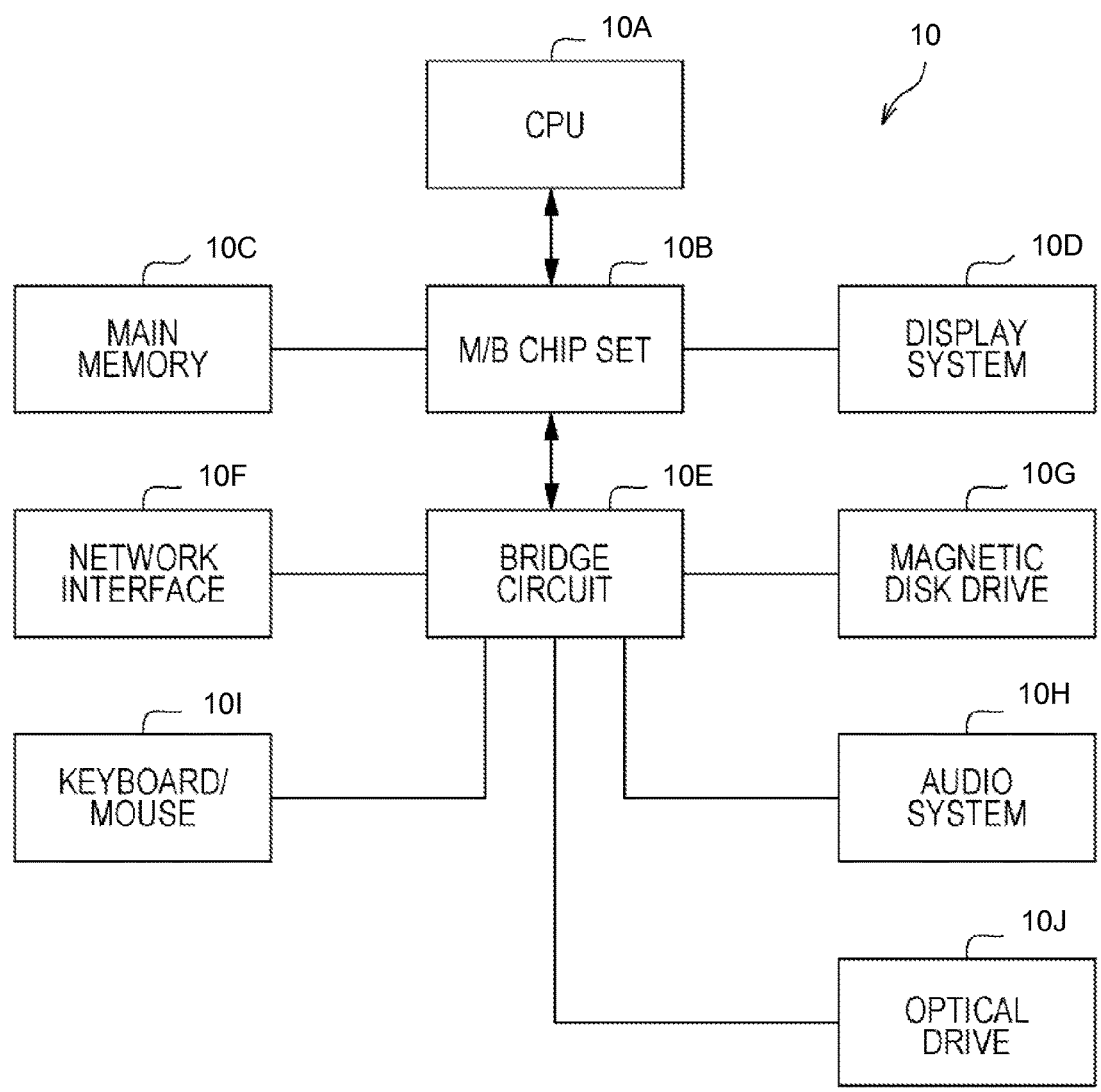
FIG. 16 is a diagram of an example of the hardware configuration of a client, in accordance with some embodiments of the present invention.

FIG. 16 is a diagram of an example of the hardware configuration of the client 10, in accordance with some embodiments of the present invention. As shown in FIG. 16, the client 10 may include a central processing unit (CPU) 10A serving as an operation unit, a main memory 10C connected to the CPU 10A via a mother board (M/B) chipset 10B, and a display system 10D connected to the CPU 10A via the M/B chipset 10B as well. The M/B chipset 10B may connect to a network interface 10F, a magnetic disk drive (HDD) 10G, an audio system 10H, a keyboard/mouse 10I, and an optical drive 10J via a bridge circuit 10E.

In FIG. 16, the components may be connected through buses. For example, the CPU 10A and the M/B chipset 10B, and the M/B chipset 10B and the main memory 10C may be connected through a CPU bus. The M/B chipset 10B and the display system 10D may be connected through an accelerated graphics port (AGP); also, in the case where the display system 10D includes a PCI Express video card, the M/B chipset 10B and the video card may be connected through a PCI Express (PCIe) bus. In connecting to the bridge circuit 10E, the network interface 10F may be a PCIe bus, for example. Examples of the magnetic disk drive 10G may include a serial AT Attachment (ATA), a parallel transfer ATA, and Peripheral Components Interconnect (PCI). For the keyboard/mouse 10I and the optical drive 10J, a universal serial bus (USB) may be used.

Although FIG. 16 shows an example of the hardware configuration of the client 10, it may, in some embodiments, be regarded as an example of the hardware configuration of the IM server 20.

The present invention may be achieved entirely by hardware or software or by both of hardware and software. The present invention can be implemented as, without limitation, a computer, a data processing system, and a computer program. The computer program can be provided via a computer-readable medium. Conceivable examples of the medium include electronic, magnetic, optical, electromagnetic, infrared, and semiconductor systems (apparatuses or units) and a transmission medium. Examples of the computer-readable medium may include a semiconductor solid-state storage unit, a magnetic tape, a removable computer diskette, a random access memory (RAM), a read-only memory (ROM), a rigid magnetic disk, and an optical disk. Examples of the optical disk at the present time may include a compact disk read-only memory (CD-ROM), a compact disk read/write (CD-R/W), and a DVD.

While the present invention has been described in its preferred embodiments, it is to be understood that the technical scope of the present invention is not limited to the embodiments. It is apparent to those skilled in the art that various changes and modifications can be made without departing from the spirit and scope of the present invention.

What is claimed is:

1. An apparatus for processing messages input from a plurality of clients, comprising:
   a processor configured to obtain a first message input from a first client, further configured to obtain a second message input from a second client, wherein the second message is a comment on a first portion of the first message;
   the processor configured to obtain, in response to a user of the second client selecting the portion of the first message, an association of the second message with a portion of the first message;
   the processor also configured to display, to the plurality of clients and in response to the second message being input, at least one copy of the first message, and at least one copy of the second message;
   the processor also configured to create, in response to obtaining the association of the second message with the portion of the first message, a link-destination-message value and a link-source-keyword value, wherein the link-destination-message value indicates that the second message is a link destination and the link-source-keyword value indicates that the first portion of the first message is a link target;
   the processor also configured to store the link-destination-message value and link-source-keyword value in a message-information storage section; and
   the processor also configured to display, to the plurality of clients and based on the link-destination-message value and link-source-keyword value, a first link that connects the at least one copy of the second message to the first portion of the at least one copy of the first message, wherein the link comprises:
- a first link end, the location of which is determined by a location of the link target;
- a second link end, the location of which is determined by a location of the link destination; and
- a line connecting the first link end to the second link end;

wherein the first message and the second message are instant messages.

2. The apparatus according to claim 1, wherein the processor is further configured to obtain a third message input from a third client, and is further configured to obtain a first user selection input from the third client, the first user selection being of a second portion of the first message and indicating that the third message is a comment on the second portion of the first message, and wherein the processor is further configured to perform, in response to the processor obtaining the first message, the second message, the third message, and the first user selection, a second control action resulting in the first message, the second message, the third message, the first link, and a second link connecting the second portion of the first message and the third message being displayed on the plurality of clients.

3. The apparatus according to claim 2, wherein the processor is further configured to obtain a second user selection input from a fourth client, the second user selection being of the first portion of the first message and indicating that only the first portion of the first message and those messages that are responsive thereto should be displayed on the fourth client, and wherein the processor is further configured to perform, in response to processor obtaining the first message, the second message, the third message, the first user selection, and the second user selection, a third control action resulting in the first message, the second message, and the first link being displayed on the fourth client and further resulting in the third message and the second link not being displayed on the fourth client.

4. The apparatus according to claim 3, wherein the processor is further configured to obtain a fourth message input from the second client, and is further configured to obtain a third user selection input from the second client, the third user selection being of a whole of the first message and indicating that the fourth message is a comment on the whole of the first message, and wherein, in response to the processor further obtaining the fourth message and the fourth comment, the third control action further results in the fourth message and a fourth link being displayed on the fourth client, the fourth link connecting the whole of the first message and the fourth message.

5. The apparatus according to claim 2, further comprising:
the processor further configured to perform, in response to obtaining the first message, the second message, the third message, and the first user selection, a first notification action resulting in the second client outputting a notice indicating that the third message has been input.

6. The apparatus according to claim 1, wherein the second message being input from the second client is in response to, on a display of the second client, a first end of a first line being moved by a user to the first portion of the first message and a second end of the first line being moved by the user to the second message.

7. The apparatus according to claim 1, wherein the processor resides on an instant messenger server in communication with the plurality of clients.

8. The apparatus according to claim 1, wherein the first portion comprises a first word in the first message and wherein at a least a second word in the first message is not included in the first portion.

9. The apparatus according to claim 1, wherein the first message comprises a second portion that is not the same as the first portion.

10. The apparatus according to claim 1, wherein the second message comprises contextual-relationship information that is not graphically displayed in the second message, wherein the contextual-relationship information specifies that the second message is a comment on a first portion of the first message, and wherein the first link graphically displays the contextual-relationship information by means of the connection from the at least one copy of the second message to the first portion of the at least one copy of the first message.

11. The apparatus according to claim 1, wherein the first message and second message are input in an instant messaging chat room, and wherein the link specifies to the plurality of clients that the second message is a reply to the first message rather than to the entire chat room.

12. The apparatus according to claim 1, wherein the portion of the first message is a keyword in the first message.

* * * * *